(12) United States Patent
Koganezawa

(10) Patent No.: US 6,532,138 B1
(45) Date of Patent: Mar. 11, 2003

(54) MECHANISM FOR PRODUCING MINUTE MOVEMENT OF A HEAD OF A DISK DEVICE

(75) Inventor: Shinji Koganezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/536,734

(22) Filed: Mar. 28, 2000

(30) Foreign Application Priority Data

Jul. 30, 1999 (JP) .......................................... 11-217904

(51) Int. Cl.⁷ ................................................ G11B 5/56
(52) U.S. Cl. .................................. 360/294.4; 360/294.6
(58) Field of Search .......................... 360/294.3, 294.4, 360/294.5, 294.6, 264.2, 245.9

(56) References Cited

U.S. PATENT DOCUMENTS 6,134,084 A * 10/2000 Ohwe et al. .............. 360/264.2
6,201,667 B1 * 3/2001 Yamamoto et al. ...... 360/264.2

FOREIGN PATENT DOCUMENTS

| JP | 9073746 | 3/1997 |
| JP | 10293979 | 11/1998 |
| JP | 11031368 | 2/1999 |

\* cited by examiner

Primary Examiner—Robert S. Tupper
(74) Attorney, Agent, or Firm—Greer, Burns & Crain, Ltd.

(57) ABSTRACT

A mechanism for producing a minute movement of a head of a disk device, which simplifies wiring in a head actuator and reduces the cost of the device by decreasing the distance between adjacent carriage arms for putting a recording medium therebetween. The mechanism for producing a minute movement of the head is placed between the base portion of a head suspension and the leading end portion of each of the carriage arms of a rocking type head actuator. This mechanism consists of an actuator base fixed at the end portion of a carriage arm, a hinge plate attached to the base portion of a head suspension, and shearing type piezoelectric elements interposed between opposite surfaces of an actuator base and the hinge plate. A step portion is provided at an end portion of the actuator base. The piezoelectric elements are placed in a portion corresponding to the thickness of the carriage arm. This prevents the sum of the thicknesses of the actuator base and the piezoelectric elements from exceeding the height of the top surface of the carriage arm. Consequently, the height of the head actuator is reduced.

17 Claims, 23 Drawing Sheets

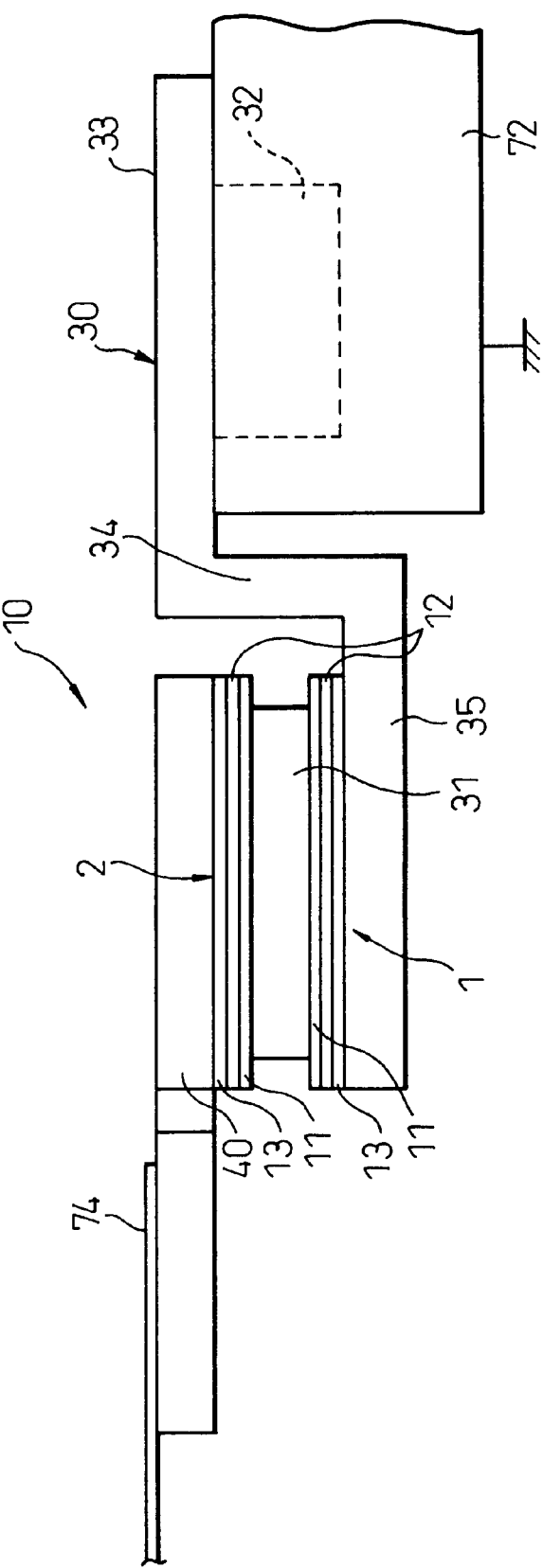

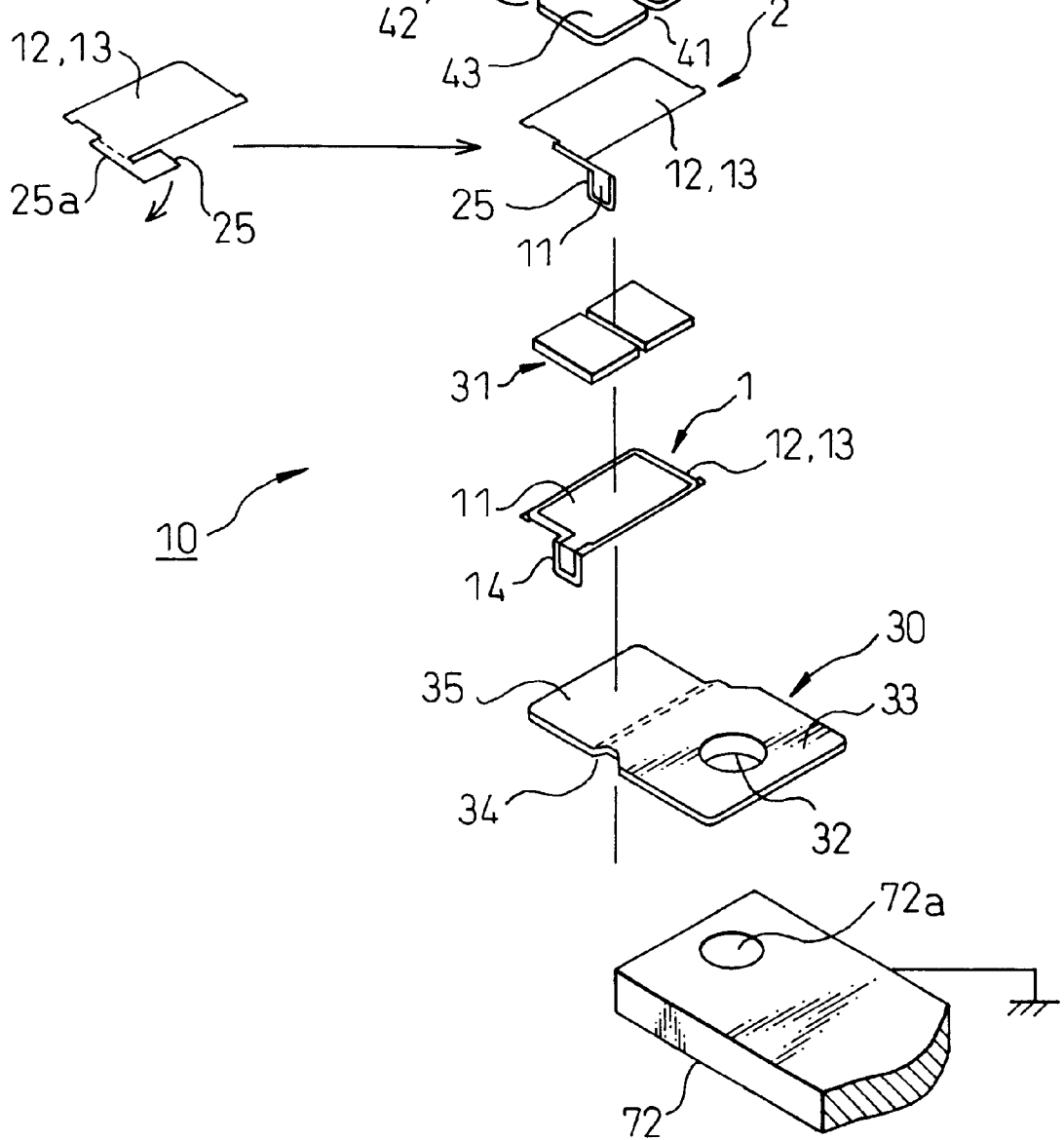

----- FOLD LINE  —·— FOLD LINE

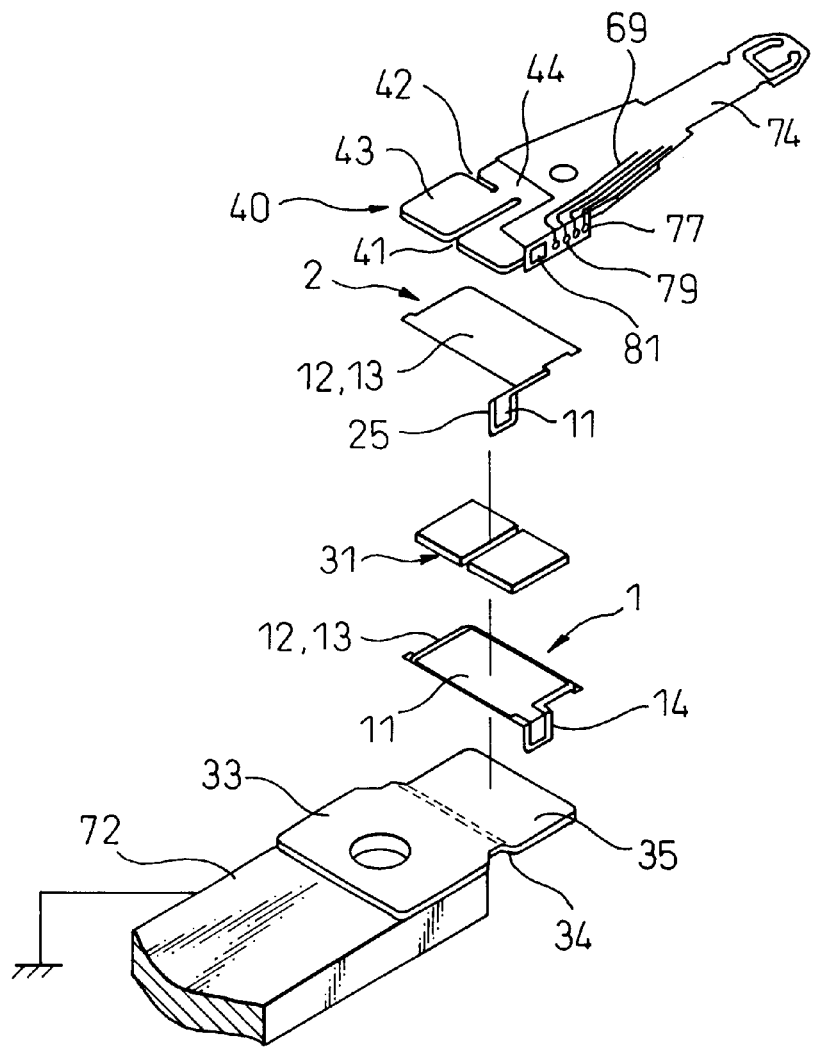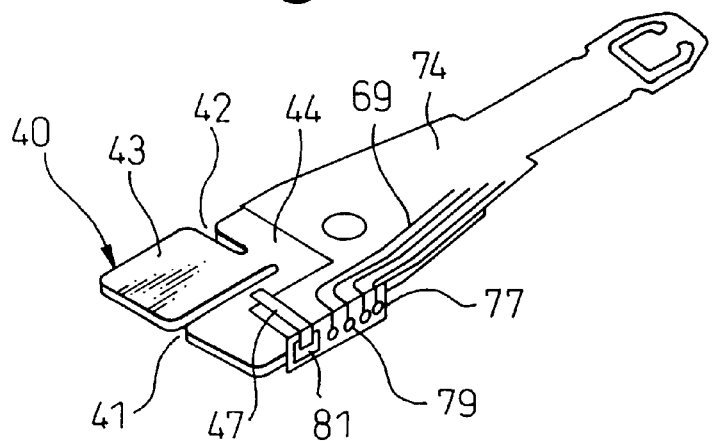

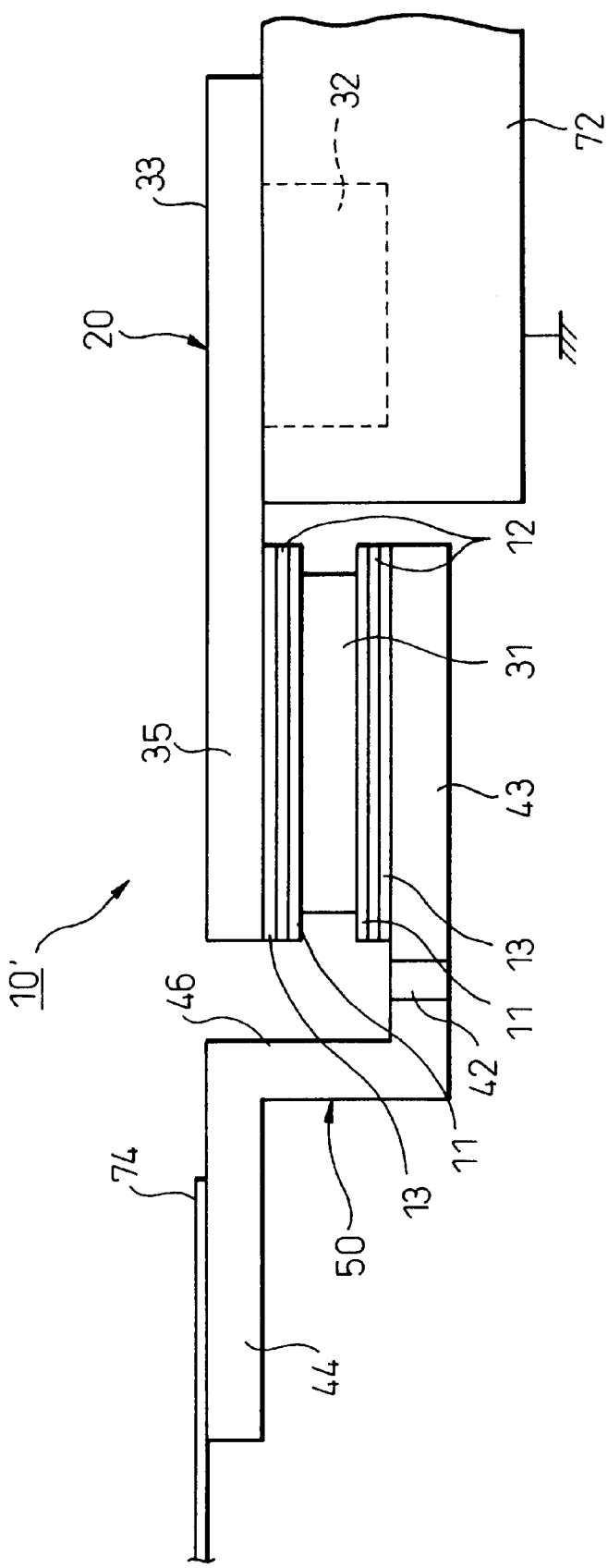

Fig.19A
Fig.19B
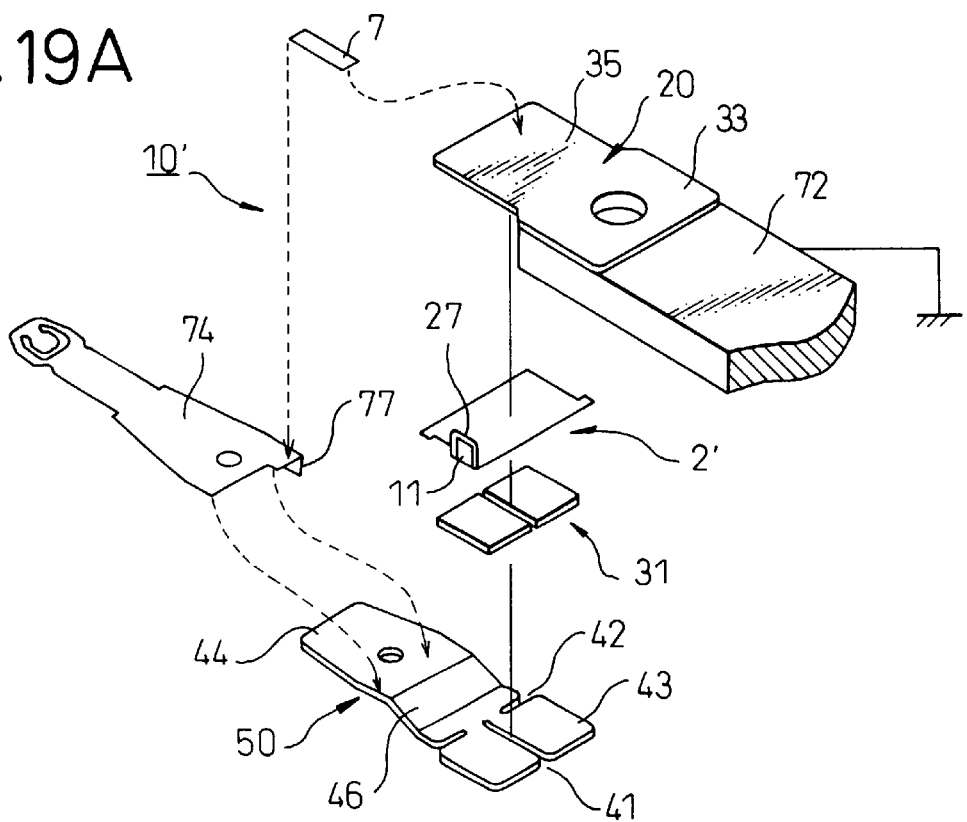
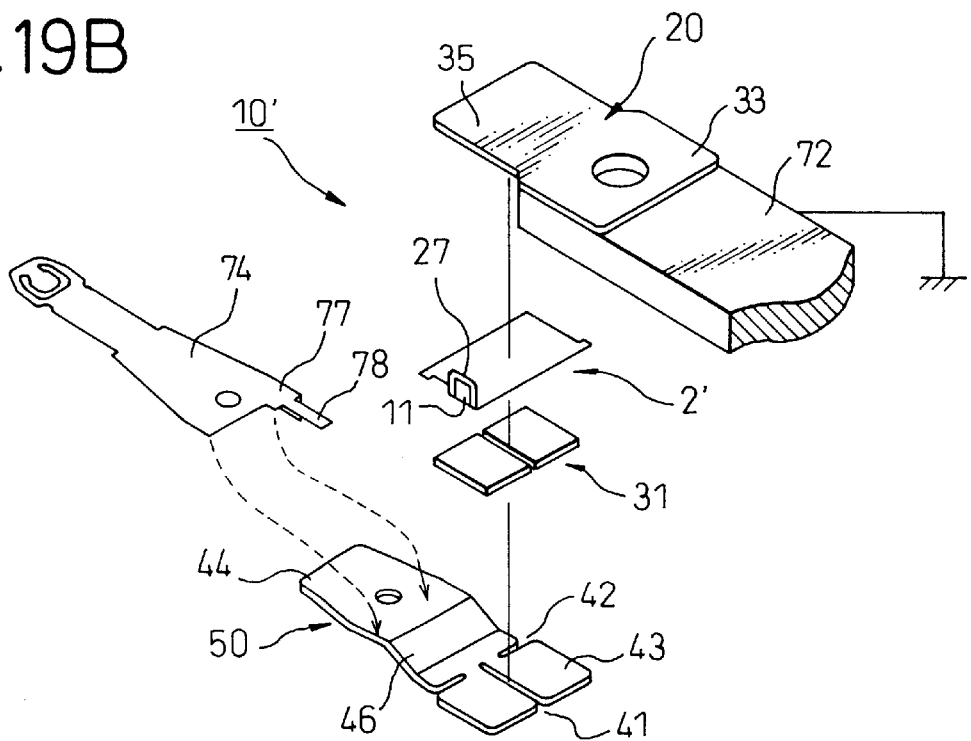

US 6,532,138 B1

MECHANISM FOR PRODUCING MINUTE MOVEMENT OF A HEAD OF A DISK DEVICE

BACKGROUND OF THE INVENTION

1. Field of the Invention

The present invention generally relates to a mechanism for producing minute movement of a head of a disk device and, more particularly, to a mechanism for causing a minute movement of a head of a disk device in the vicinity of a leading end of a piezoelectric element by utilizing shear deformation of the piezoelectric element.

2. Description of the Related Art

In recent years, the processing precision of information devices has advanced. Thus, there is a demand for actuators required to control micro-distance movement of constituent components of the information devices. That is, actuators capable of controlling micro-distance movement of a head or the like are needed in the fields of, for example, devices for correction of focal points of optical systems and control of tilt angles of optical components thereof, printing devices for printers, and head actuators of magnetic disk devices.

Among such information devices, a magnetic disk device a primary multimedia device, the scale of the market of which has sharply increased. Multimedia devices deal with mass image and audio data at high speeds. Thus, there is a need for development of a device having higher storage capacity. Generally, a magnetic disk mass storage device realized by increasing the storage capacity per disk.

However, it is indispensable for realizing a magnetic disk medium having a high recording density to increase the number of tracks per inch (TPI), that is, to reduce the width of each track. Further, when the storage density of a magnetic disk is significantly increased, the track pitch abruptly decreases. Thus, there is a technical problem as to how the positioning of a head element for reading data from and writing data to a recording track is accurately performed. Hence, there has been put to practical use a head actuator, which is caused by a motor called a "VCM" to perform a rocking motion and has a mechanism capable of causing minute movement of a head independently of a driving operation by the VCM. This mechanism for producing a minute movement of a head must be miniaturized.

SUMMARY OF THE INVENTION

A first object of the present invention is to provide a mechanism for producing a minute movement of a head, which is suitable for accessing disks in a narrow space between stacked disks, in a head actuator of a magnetic disk unit having such a mechanism.

A second object of the present invention is to reduce the cost of a disk device by simplifying the wiring for driving a mechanism for producing a minute movement of a head and wiring for connecting a head suspension to the ground.

To achieve the foregoing objects, according to an aspect of the present invention, there is provided a mechanism (hereunder sometimes referred to as a first mechanism of the present invention) for producing a minute movement of a head, provided between a base portion of a head suspension having the head at an end portion thereof and an end portion of a carriage arm swinging around a rotation shaft in a rocking type head actuator. This mechanism comprises a stationary member, which is fixed to the end portion of the carriage arm, a moving member, which is attached to the base portion of the head suspension, and a displacing member, which is interposed between a free-end-side predetermined-area surface of the stationary member and a free-end-side predetermined-area surface of the moving member opposed to the stationary member, having a top surface to be displaced with respect to a bottom surface thereof by applying a voltage in a direction of the thickness thereof. This displacing member is placed at a side opposite to a recording medium to be accessed, with respect to an attaching surface of the stationary member, which is attached to the end portion of the carriage arm, and an attaching surface of the moving member, to which the base portion of the head suspension is attached.

In the first mechanism of the present invention, a space formed between the free-end-side predetermined-area surface of the stationary member and the free-end-side predetermined-area surface of the moving member by folding a part adjoining the attaching surface of the stationary member, which is attached to the end portion of the carriage arm, like a crank, to a side of the recording medium. The displacing member is accommodated in this space.

Further, in the first mechanism of the present invention, a space formed between the free-end-side predetermined-area surface of the stationary member and the free-end-side predetermined-area surface of the moving member by folding a part adjoining the attaching surface of the moving member, which is attached to the end portion of the carriage arm, like a crank, to a side of the recording medium. The displacing member is accommodated in this space.

Furthermore, the first mechanism of the present invention has the following characteristic features:

(1) Application of the voltage to the displacing member is performed by sheet-like electrode members provided on the top and bottom surfaces of the displacing member. Moreover, insulating members are interposed between the electrode member and the stationary member and between the electrode member and the moving member. Each of the electrode members has a connecting terminal portion connected to a lead wire that is connected to a power supply.

(2) The carriage arm is connected to the ground. The stationary member is constituted by an electrical conductor and fixed to the end portion of the carriage arm in such a manner as to electrically conduct. An insulating layer, a conductive layer, and an electrode member having a connecting terminal portion connected to a lead wire, which is connected to a power supply, are provided between the stationary member and the displacing member so that the conductive layer is provided at the side of the displacing member. The moving member is constituted by an electrical conductor and is attached to the base portion of the head suspension in such a way as to electrically conduct. The moving member is connected to the stationary member by an electrical conductor.

(3) The carriage arm is connected to the ground. The stationary member is constituted by an electrical conductor and fixed to the end portion of the carriage arm in such a manner as to electrically conduct. An insulating layer, a conductive layer, and an electrode member having a connecting terminal portion connected to a lead wire that is connected to a power supply, are provided between the stationary member and the displacing member so that the conductive layer is provided at the side of the displacing member. The moving member is constituted by an electrical conductor and is attached to the base portion of the head suspension in such a way as to electrically conduct, and is overlaid directly on the displacing member. The moving member is connected to the stationary member by an electrical conductor.

The conductor is also used as a part of the head suspension.

(4) The moving member is constituted by an electrical conductor. An electrode member consisting of an insulating layer and an electrical conductive layer is fixed to a base-portion-side part of a surface of the moving member, which is opposite to the displacing member. The electrode member has a wire connecting portion connected to external wiring. The conductive layer of the electrode member is connected to the moving member by an electrical conductor. The electrical conductor can be a conductive adhesive agent.

(5) The carriage arm is connected to the ground. An electrode member consisting of an insulating layer, an electrical conductive layer, and a connecting terminal portion to be connected to an external lead wire is provided so that the conductive layer is in contact with a moving-member-side surface of the displacing member. A stationary-member-side surface of the displacing member is electrically connected to the carriage arm through the stationary member constituted by an electrical conductor. The moving member, to which the head suspension is attached, is constituted by an electrical conductor and connected to the stationary member by an electrical conductor.

(6) The carriage arm is connected to the ground. An electrode member consisting of an insulating layer, an electrical conductive layer, and a connecting terminal portion to be connected to an external lead wire is provided so that the conductive layer is in contact with a moving-member-side surface of the displacing member. A stationary-member-side surface of the displacing member is electrically connected to the carriage arm through the stationary member constituted by an electrical conductor. The moving member is constituted by an electrical conductor, is connected to the base portion of the head suspension in such a way as to electrically conduct, and is overlaid directly on the displacing member. The head suspension is connected to the stationary member by an electrical conductor.

Further, the mechanism of the configurations (1) to (6) may have the following characteristic features:

(7) The electrode member is constituted by stacking a stainless-steel thin plate, a polyimide layer, and a copper foil in this order.

(8) The electrode member is constituted by a flexible printed circuit board. The connection of the printed circuit board, the piezoelectric element, the moving member, and the stationary member is performed by gluing.

(9) The wire connecting portion of the electrode member is folded in such a way as to fit along a side surface of the carriage arm.

(10) The moving member has a hinge portion for increasing a moving range of the head suspension. Moreover, the electrode member has a notch formed in accordance with a shape of a hinge of the moving member having the hinge.

Incidentally, in any of the mechanisms of the aforementioned configurations, a surface, on which the moving member is mounted, of the head suspension can be flush with an outer surface of the stationary member opposite to an inner surface which is mounted on the carriage arm.

Further, to achieve the foregoing objects, according to another aspect of the present invention, there is provided a mechanism for producing a minute movement of a head, which is provided between a base portion of a head suspension having a head at an end portion thereof and an end portion of a carriage arm adapted to swing around a rotation shaft in a rocking type head actuator. This mechanism comprises a stationary member fixed at an end portion of the carriage arm, a moving member attached to the head suspension, a displacing member which is interposed between a predetermined free-end-side region surface of the stationary member and a predetermined free-end-side region surface of the moving member opposed to this stationary member and has a top surface adapted to be displaced with respect to a bottom surface thereof by applying a voltage in the direction of thickness thereof, and a sheet-like electrode member which is disposed on at least one of top and bottom surfaces of this displacing member and which consists of an insulating layer and conductive layers. The electrode member has a wire connecting portion connected to external wiring. This wire connecting portion is folded along a side surface of the carriage arm.

According to the present invention, in a head actuator of a magnetic disk device, a mechanism for producing a minute movement of the head can have a structure suitable for accessing disks mounted at small intervals. Moreover, the cost of the disk device can be reduced by simplifying the wiring for driving the mechanism for producing a minute movement of the head, and the wiring for connecting the head suspension to the ground.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 6 is a side view showing the constitution of a first embodiment of the present invention;

FIG. 7A is an assembling perspective diagram showing the practical constitution of the first embodiment of the present invention;

FIG. 7B is a perspective diagram showing a condition of a second electrode before processed;

FIG. 15A is an assembling perspective diagram showing the practical constitution of a fourth embodiment of the present invention;

FIG. 15B is a perspective diagram showing the fourth embodiment after a head suspension and a hinge plate are assembled;

FIG. 16 is a side view showing the constitution of a fifth embodiment of the present invention;

FIG. 19A is an assembly perspective diagram showing the practical constitution of a sixth embodiment of the present invention;

FIG. 19B is an assembly perspective diagram showing the practical constitution of a modification of the sixth embodiment of the present invention;

DETAILED DESCRIPTION OF THE PREFERRED EMBODIMENTS

Before describing the preferred embodiments of the present invention, an explanation will be given of a conventional mechanism for producing a minute movement of a head of a disk device, which is shown in FIGS. 1 to 3B.

Figure 1:
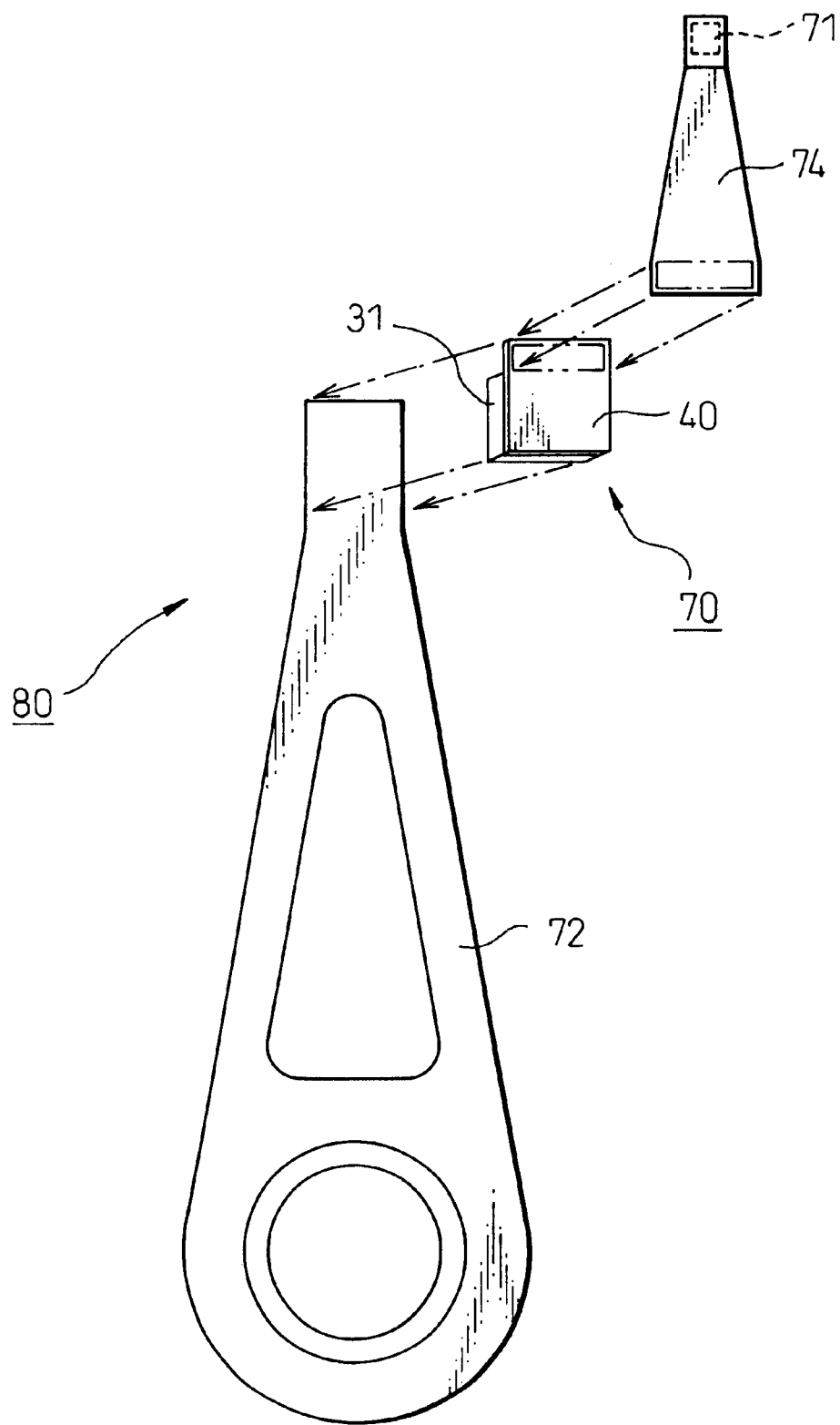
FIG. 1 is an assembly perspective diagram showing the constitution of a conventional mechanism for producing a minute movement of a head.

FIG. 1 illustrates the essential constitution of a head actuator 80 of a disk device provided with a mechanism 70 which has been already proposed (in the Japanese Patent Laid-Open No. 11-31368 Official Gazette) and used for producing a minute movement of a head. In FIG. 1, reference numeral 72 designates a carriage arm of the head actuator 80. A base portion of a head suspension portion 74 having a leading end part, to which a head slider 71 is attached, is mounted onto a leading end portion of this carriage arm 72 through the mechanism 70. The mechanism 70 consists of shearing-type piezoelectric elements 31 and a moving member 40. The base portion of the head suspension 74 is attached to an end of the moving member 40. Further, when a voltage is applied in a direction of thickness of the piezoelectric element 31, the piezoelectric elements 31 undergo shear deformation. Thus, the moving member 40 is displaced, so that the head slider 71 provided at the end portion of the head suspension 74 is minutely displaced.

Figure 2:
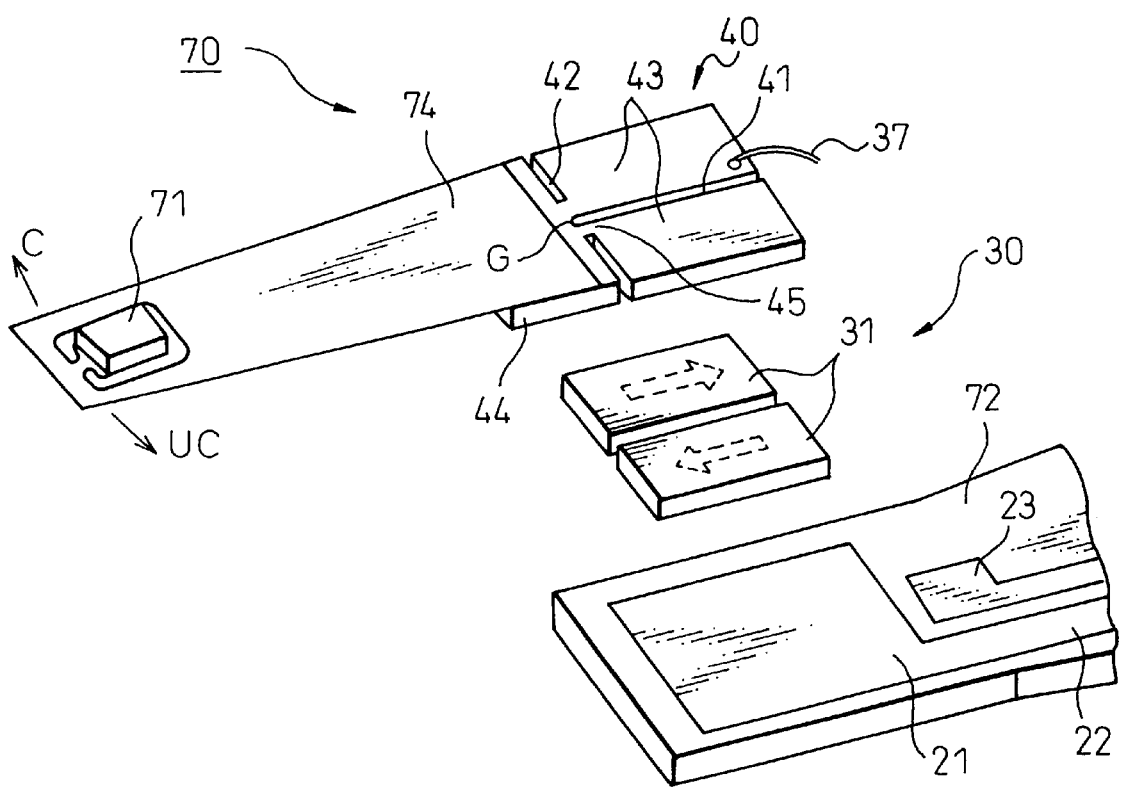
FIG. 2 is an assembly perspective diagram showing the practical constitution of the conventional mechanism for producing a minute movement of a head.

The moving member 40 actually has a movement-amount increasing mechanism for increasing the movement-amount of the head suspension 74. FIG. 2 shows this example. In the case of this example, two piezoelectric elements 31 of the shearing type are attached onto the carriage arm 72. Two arrows described by dashed lines on the piezoelectric elements 31 indicate the directions of polarization thereof, which are perpendicular to the direction of thickness of the piezoelectric elements 31 and opposite to each other. An electrode 21 and wiring patterns 22 and 23 for applying a voltage to the piezoelectric elements 31 are provided on the carriage arm 72.

In the moving member 40 mounted on the two piezoelectric elements 31, a first notch 41 serving as the movement-amount increasing mechanism is provided corresponding to the position of a space between the two piezoelectric elements 31. Also, second notches 42 serving as the movement-amount increasing mechanism are respectively formed from both side ends of the moving member 40 in directions perpendicular to the first notch 42. A hinge 45 is formed at a portion at which the first notch 41 intersects with each of the second notches 42. Further, a leading-end-side portion of the moving member 40 partitioned by the second notch 42 acts as a movement-amount increasing portion 44. The base portion of the head suspension 74 having the head slider 71 at the leading end portion thereof is attached to this movement-amount increasing portion 44. A stationary member 40 serves as one of the electrodes of the piezoelectric elements 31. A part of the stationary member 40 is connected to the wiring pattern 23 by a lead wire 37 so as to apply an electric potential to the stationary member 40.

In the case of the mechanism 70 for producing a minute movement of a head in this example, the head slider 71 can be displaced in the directions of arrows U and UC by applying a voltage between the electrode 21 and the moving member 40.

However the mechanism for producing a minute movement of a head, which is disclosed by the Japanese Patent Laid-Open No. 11-31368 Official Gazette, has a three-layer structure in which the piezoelectric elements 31 are mounted on the electrode 21 of the carriage arm (or head arm) 72, and in which the head suspension (or spring arm) 74 is mounted on the piezoelectric elements 31 through the moving member 40. As compared with a thickness of only a head mounting block of another conventional mechanism, the thickness of the mechanism for producing a minute movement of a head disclosed in the aforementioned Official Gazette is increased by a thickness of a part from the carriage arm 72 to the head suspension 74. Thus, the mechanism disclosed in the aforementioned Official Gazette has a drawback in that the structure of this mechanism is not suitable for reducing the thickness of the head actuator 80. Furthermore, such an increase in the thickness of the mechanism results in an increase in the interval between the adjacent disks. Thus, the number of disks, which can be mounted in the disk device, is reduced. Consequently, this mechanism has another drawback in that the storage capacity of a disk unit employing this mechanism is less than that of another conventional disk device, which is of the same height as the disk unit.

Further, the head suspension of the magnetic disk device should be electrically connected to the ground so as to reduce the noise caused on a recording signal inputted to and a reproducing signal outputted from the head. In an ordinary head actuator having no mechanism for producing a minute movement of a head, usually, a carriage arm is connected to the ground. Thus, a head suspension caulked to this carriage arm is also connected to the ground. However, a head actuator, into which a mechanism for producing a minute movement of a head is incorporated, has a structure in which piezoelectric elements are inserted between a carriage arm and a head suspension. This head actuator, therefore, requires a line for connecting the head suspension to the ground, and a line for driving the piezoelectric actuators.

However, in the case of the mechanism for producing a minute movement of a head which is described in the Japanese Patent Laid-Open No. 11-31368 Official Gazette, the piezoelectric elements 31 are sandwiched between the carriage arm 72 and the moving member (or hinge plate) 40. It is, thus, difficult to draw out the wire from the electrode. Moreover, stainless steel (SUS) materials are used as the materials of the carriage arm 72 and the moving member 40. Thus, the connectivity of a solder connection of a copper wire to each of such composing elements is extremely low. This makes it more difficult to route the aforementioned wires.

Figure 3A:
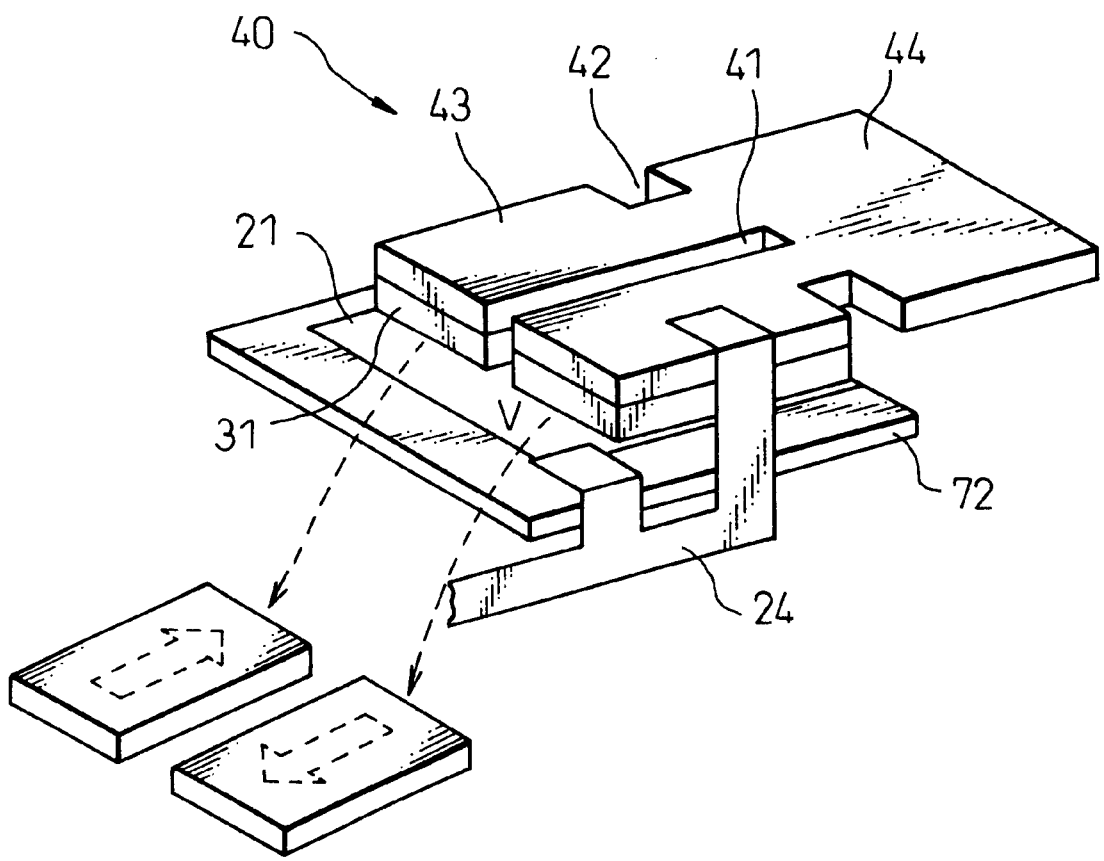
FIG. 3A is a perspective diagram showing a wiring structure of the conventional mechanism for producing a minute movement of a head.
Figure 3B:
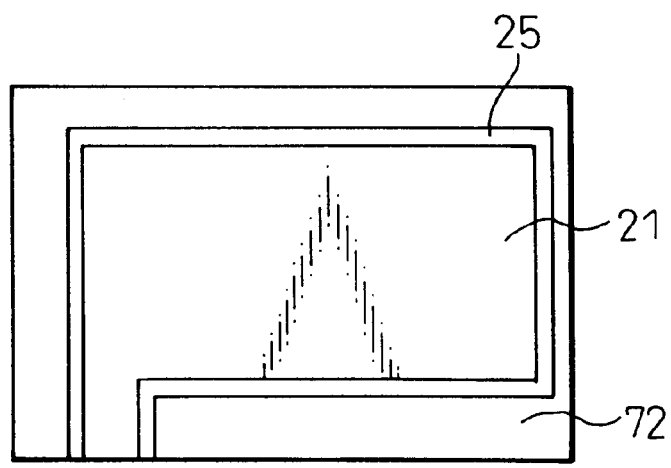
FIG. 3B is a plan diagram showing a base of FIG. 3A.
Figure 17:
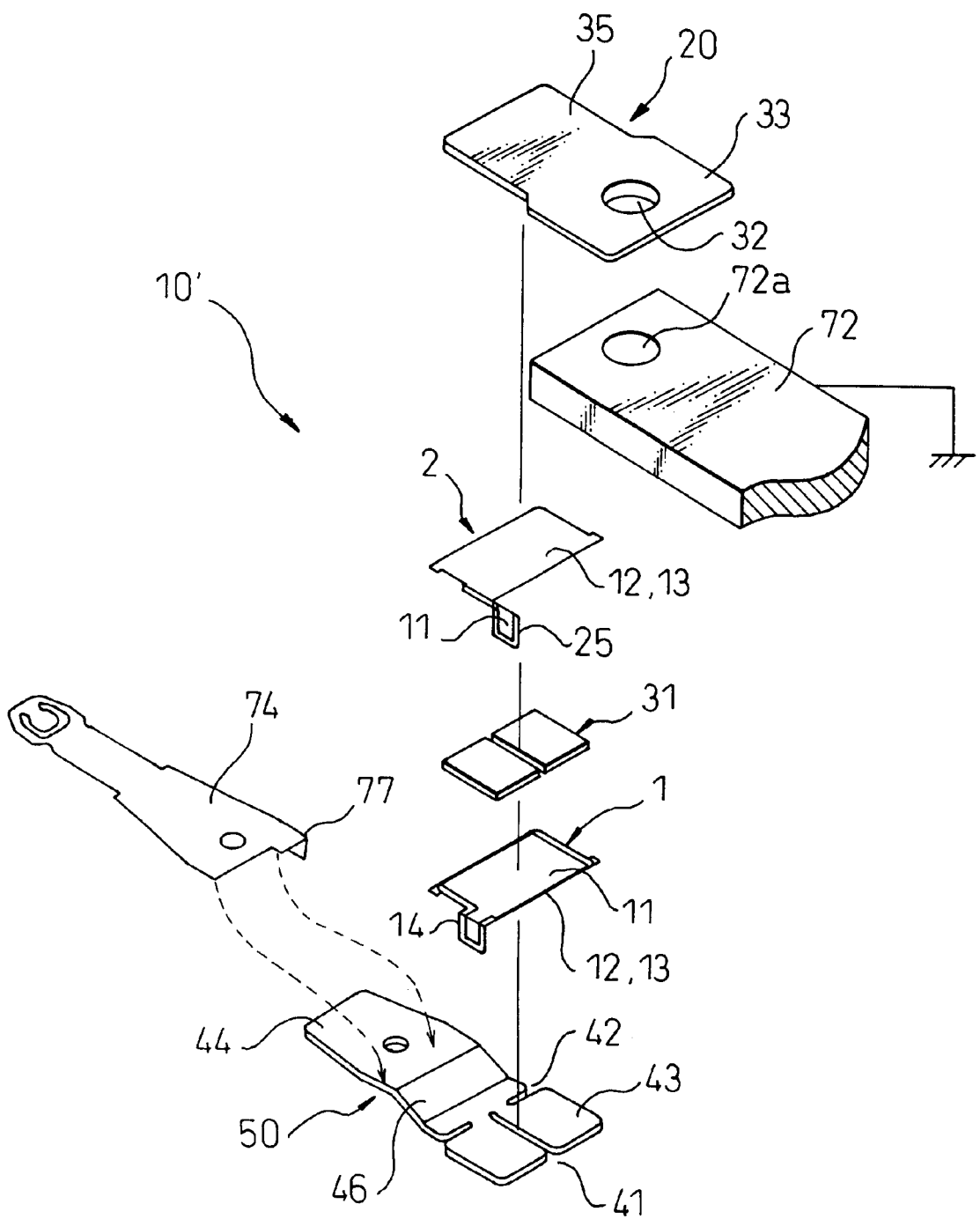
FIG. 17 is an assembly perspective diagram showing the practical constitution of the fifth embodiment of the present invention.

On the other hand, it is considered that a relay flexible printed circuit board (namely, a relay FPC) 24 is folded and connected directly to the moving member 40, as illustrated in FIG. 3A (namely, FIG. 17 described in the Japanese Patent Laid-Open No. 11-31368). However, an operation of connecting the relay FPC 24 thereto is performed after the piezoelectric elements 31 and the moving member 40 are attached to the carriage arm 20. It is, thus, difficult to secure a space for attaching the folded relay FPC 24 thereto. Therefore, the operation of attaching the relay FPC 24 thereto is troublesome and difficult to perform.

Hereinafter, the methods of implementing the mechanism 10 for producing a minute movement of a head according to the present invention will be described in detail based on practical embodiments thereof. Incidentally, in the figures, each of constituent members of the mechanism 10 of the present invention, which is the same as the corresponding constituent member of the conventional mechanism described by referring to FIGS. 1 to 3B, will be described by being designated by the same reference character as denoting the latter corresponding constituent element of the conventional mechanism.

Figure 4A:
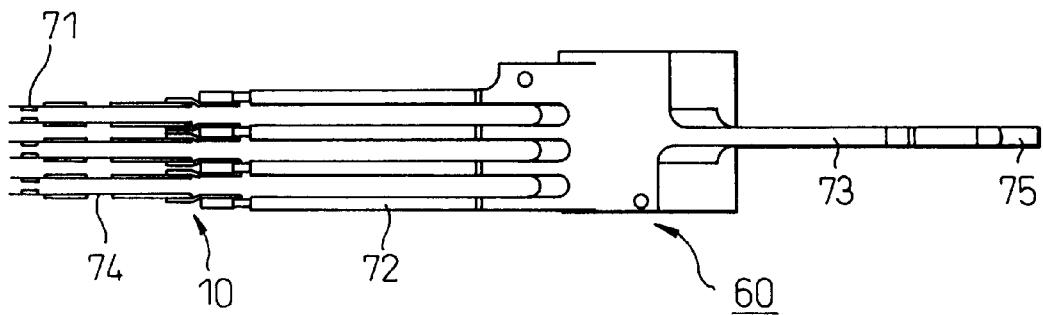
FIG. 4A is a left-hand side view of a head actuator having a mechanism for producing a minute movement of a head according to the present invention.
Figure 4B:
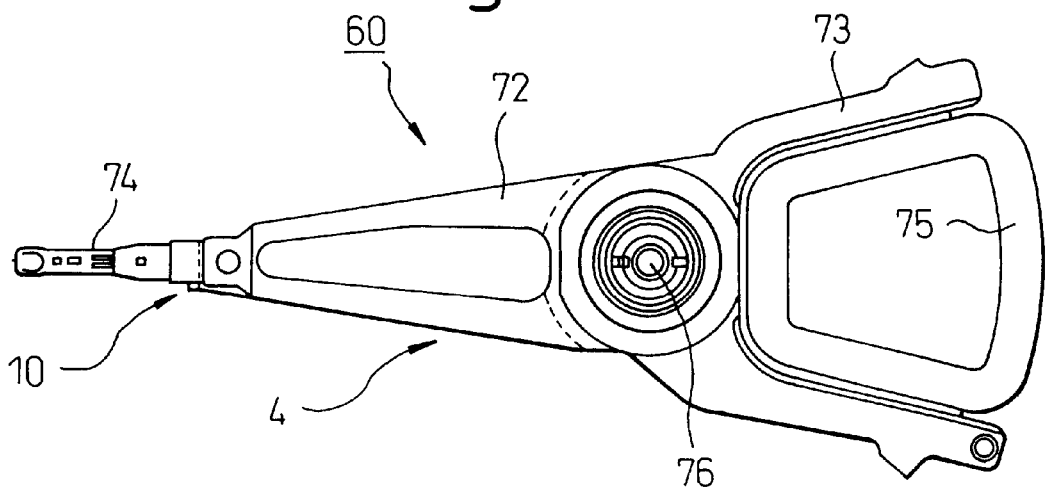
FIG. 4B is a plan view of the head actuator having the mechanism for producing a minute movement of the head according to the present invention.
Figure 4C:
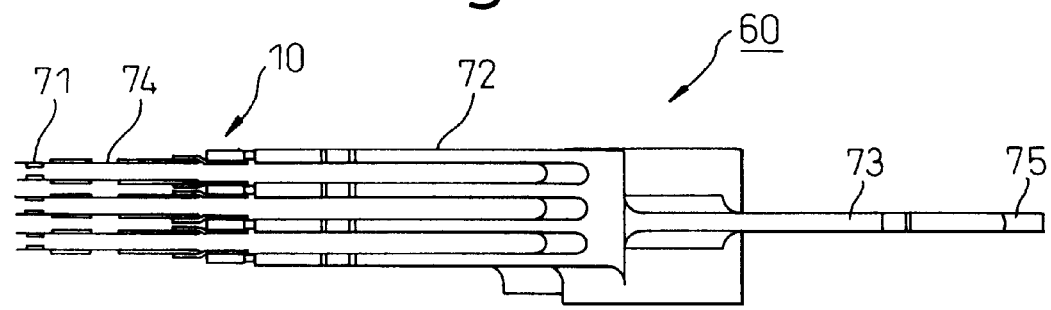
FIG. 4C is a right-hand side view of a head actuator having the mechanism for producing a minute movement of the head according to the present invention.

FIGS. 4A to 4C show the constitution of a head actuator 60, which has the mechanism 10 for producing a minute movement of a head according to the present invention, in a disk device. FIGS. 4A, 4B, and 4C are a left-hand side view, a plan view, and a right-hand side view of the head actuator 60. This head actuator 60 is mounted on a rotation shaft 76 of a pin and swings around this rotation shaft 76. The carriage arm 72 formed in such a way as to be like a comb when seen from a side thereof is provided at the other side of the rotation shaft 76. One or two head suspensions 74 are attached to a tip end of each carriage arm 72. A head slider 71 having a head for transferring data to and from a disk medium is provided at a tip end of the head suspension 74.

Two support arms 73 are provided at the other-side end of the rotation shaft 76. A flat coil 75 is supported between the support arms 73. The flat coil 75 is provided in such a way as to be opposite to a magnetic circuit (not shown) provided at a base-side portion of the disk device. The head actuator 60 swings according to a value of the level of electric current fed to the flat coil 751. The mechanism 10 for producing a minute movement of the head is provided between the head suspension 74 and the carriage arm 72 of each set and is operative to cause a minute movement of the head suspension 74 independent of a swinging motion of the head actuator 60.

Figure 5A:
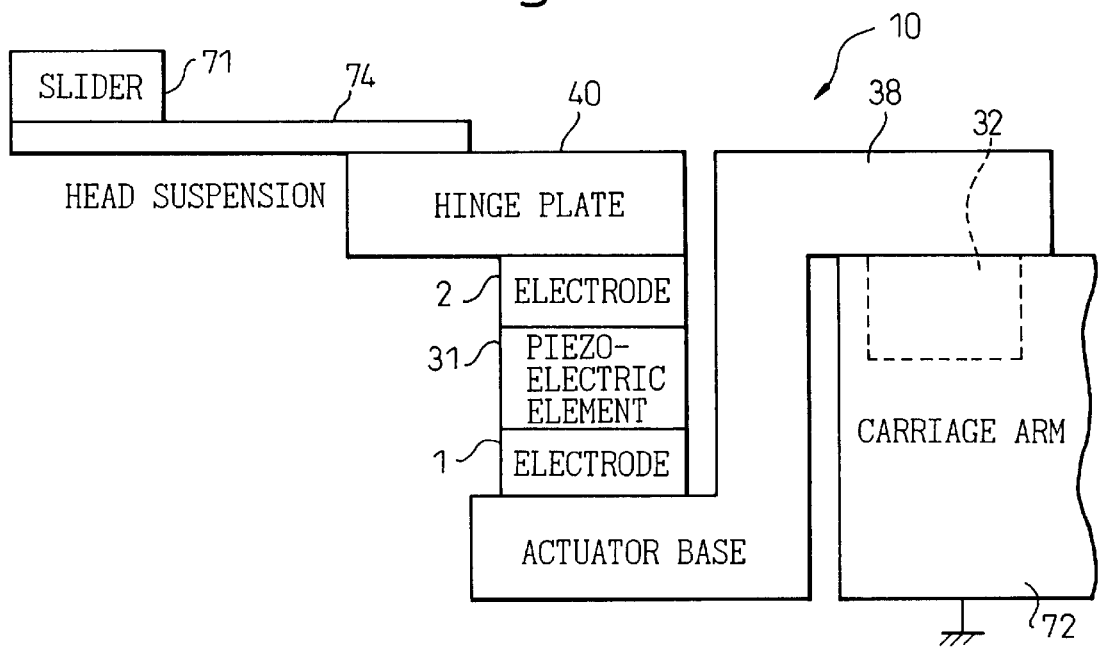
FIG. 5A is a diagram schematically showing a first mode of a mechanism for producing a minute movement of a head according to the present invention.
Figure 5B:
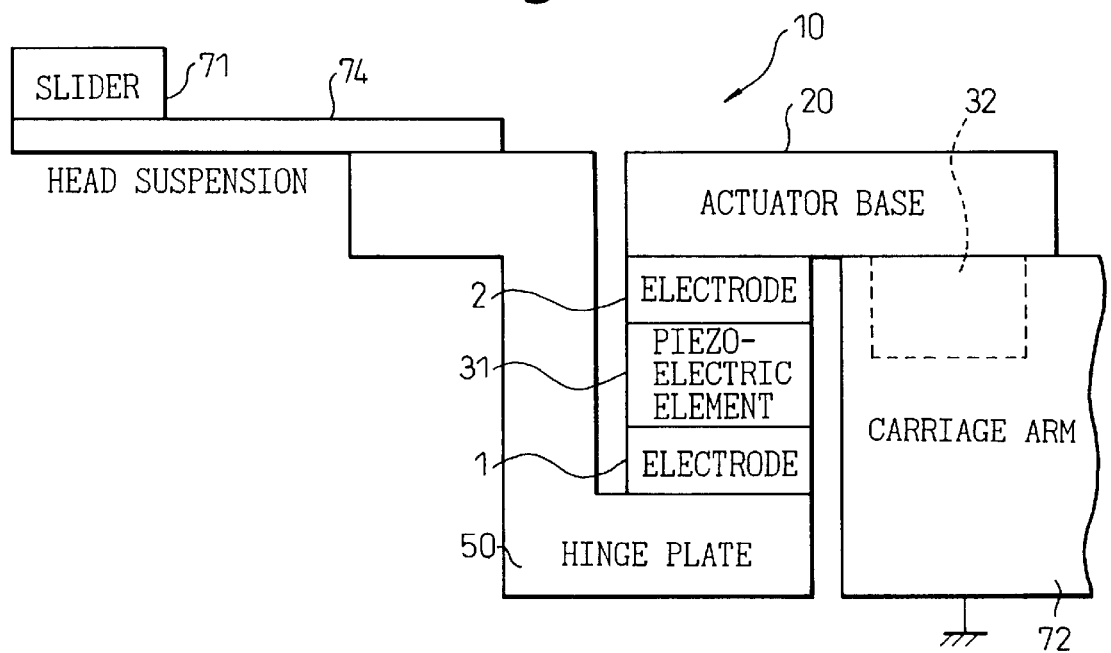
FIG. 5B is a diagram schematically showing a second mode of a mechanism for producing a minute movement of a head according to the present invention.

FIGS. 5A and 5B show the essential constitution of the mechanism 10 for producing a minute movement of the head as two modes of embodiments which can be obtained by practicing the present invention. Basically, the mechanism 10 for producing a minute movement of the head according to the present invention consists of an actuator base 30 serving as a stationary member fixed at a tip end portion of the carriage arm 72, a hinge plate 40 serving as a moving member attached to the base portion of the head suspension 74, and a piezoelectric element 31 serving as a displacing member interposed between the actuator base 30 and the hinge plate 40. Shearing type piezoelectric devices, whose top surfaces are displaced with respect to the bottom surfaces thereof by applying a voltage thereto in a direction of thickness thereof, are used as the piezoelectric elements 31. In this embodiment, electrodes 1 and 2 are provided on the top and bottom surfaces of the piezoelectric element 31, respectively, so as to apply a voltage to the piezoelectric element 31 in the direction of thickness thereof. The actuator base 30 or the hinge plate 40 may be constituted by an electrical conductor and used instead of one of the electrodes 1 and 2.

In the mechanism of the present invention, the piezoelectric element 31 is placed at a side opposite to the slider 71 with respect to an attaching surface, which is connected to a tip end portion of the carriage arm 72, of the actuator base 38. Moreover, the piezoelectric element 31 is placed at the side opposite to the slider 71 with respect to an attaching surface, which is connected to the base portion of the head suspension 74., of the hinge plate 40. This is because a dead space due to the thickness of the carriage arm 72 is utilized for constituting the mechanism 10 for producing a minute movement of the head, owing to the fact that the thickness of the carriage arm 72 is much greater than the thickness of each of the actuator base 30 and the hinge plate 40.

There are considered two modes, namely, first and second modes of constituting the mechanism 10 at such a place. In the first mode, such a space provided between the plate-like hinge plate 40 and the actuator base 30 by folding the actuator base 30 like a crank in a direction in which the actuator base 30 thus becomes further away from the slider 71, as illustrated in FIG. 5A. In the second mode, such a space is provided between the plate-like actuator base 30 and a hinge plate 50 by folding the hinge plate 50 against the plate-like actuator base 20 like a crank in a direction in which the hinge plate 50 becomes further away from the slider 71, as illustrated in FIG. 5B. Hereunder, the mechanisms for producing a minute movement of a head, which are respectively constituted in the first and second modes, will be described by being designated by the same reference character 10.

Thus, first, the mechanisms of the present invention for producing a minute movement of the head, which are constituted in the first mode, will be described here in below, based on first to fourth embodiments thereof.

FIG. 6 shows the constitution of the mechanism 10 for producing a minute movement of a head, which is the first embodiment of the present invention. In the first embodiment, a stationary portion 33 of the actuator base 30 is fixed to the carriage arm 72 by a caulking projection 32. The carriage arm 72 is usually connected to the ground. An end portion 35 of the actuator base 30 is folded twice like a crank. Further, a step or ramp portion 34 is formed between the stationary portion 33 and the end portion 35. The end portion 35 is folded in such a manner as to be in parallel with the stationary portion 33. The piezoelectric elements 31 sandwiched between the first electrode 1 and the second electrode 2 are mounted on the end portion 35 of the actuator base 30.

Each of the first electrode 1 and the second electrode 2 consists of a conductive layer 11 constituted by an electrical conductor, such as copper, an insulating layer 12 constituted by an electrical insulator, such as polyimide, and a conductive layer 13 constituted by an electrical conductor, such as stainless steel, which are stacked from the side of the piezoelectric elements 31 in this order. The use of a copper layer as the conductive layer 11 facilitates solder connection between this layer and a relay wire (to be described later). This makes the assembly work of this mechanism easier and contributes to a reduced cost thereof. Moreover, the polyimide layer and the copper layer can be formed thinner, by thin film deposition. This enables reduction in thickness of the electrodes, and contributes to a reduced thickness of a piezoelectric actuator. Furthermore, the base portion of the head suspension 74 is fixed onto this second electrode 2 through the hinge plate 40. Incidentally, these two layers, namely, the conductive layer 11 and the insulating layer 12 may be used as the electrodes 1 and 2. Further, instead of the SUS material, polyimide, and copper layer materials, materials equivalent thereto, for instance an FPC, may be used as the materials of these layers.

During assembly, the top surfaces of the actuator base 30 and the hinge plate 40 are trued up and made to be flush with each other by setting the height of the step portion 34 of the actuator base 30 at a predetermined height. Thus, when the top surfaces of the actuator base 30 and the hinge plate 40 are trued up and flush with each other, the hinge plate 40 can be easily connected to the ground by connecting the actuator base 30 and the hinge plate 40, which are to be connected to the ground, through an electrical conductor.

FIG. 7A, shows the practical constitution of the first embodiment of the present invention. The stationary portion 33 of the actuator base 30 is inserted, using a caulking projection 32, into a caulking hole 72a bored in the carriage arm 72, and then caulked and fixed thereto. The carriage arm 72 is connected to the ground. The end portion 35 of the actuator base 30 is made by the step portion 34 to be lower than the stationary portion 33 by a height of one step or ramp. The piezoelectric elements 31 put between the first electrode 1 and the second electrode 2 are mounted on the end portion 35. Each of the first electrode 1 and the second electrode 2 has the three-layer structure described by referring to FIG. 6. Each of the conductive layers 11 is placed at a side that is in contact with the piezoelectric elements 31.

A wire connecting portion 14 projecting from the end portion 35 to a side thereof is provided in the first electrode 1. This wire connecting portion 14 is folded at a right angle toward a side in such a way as to be away from the piezoelectric elements 31 and to be in parallel with a side surface of the carriage arm 72 after the piezoelectric elements 31 are mounted on the end portion 35. The conductive layer 11 of the first electrode 11 is provided at the side, which is in contact with the piezoelectric elements 31, and thus directed outwardly with the wire connecting portion 14 folded as described above.

On the other hand, a wire connecting portion 25 is provided in the second electrode 2. This wire connecting portion 25 is constituted in such a way as to be adjacent to the wire connecting portion 14 of the first electrode 1 when folded. Thus, the wire connecting portion 25 of the second electrode 2 is provided in such a manner as to protrude from the second electrode 2 to the side of the carriage arm 72, as illustrated in FIG. 7B. Further, the wire connecting portion 25 and the second electrode 2 are connected an ear portion 25a slightly protruding sideways from the end portion 35 of the actuator base 30. This wire connecting portion 25 is made parallel with a side surface of the carriage arm 72, while the conductive layer 11 of the second electrode 2 is exposed to the outside as illustrated in FIG. 7A, by folding a border portion, which is indicated by a dotted line, between the ear portion 25a and the second electrode 2 at a right angle so that the portion 25 is a valley portion.

The piezoelectric elements 31 between the first electrode 1 and second electrode 2 are the same as the elements 31 described with reference to FIG. 2. The directions of polarization of the piezoelectric elements 31 are perpendicular to the direction of thickness of these element's and are opposite to each other. Moreover, the hinge plate 40 mounted on the piezoelectric elements 31 is the same as the element 40 described with reference to FIG. 2, and has base portions 43 and a movement-amount increasing portion 44 partitioned by a first notch 41 and second notches 42. Furthermore, the base portions 43 of the hinge plate 40 are mounted on the second electrode 2. The head suspension 74 is fixed to the movement-amount increasing portion 44 of the hinge plate 40 by spot welding. Incidentally, reference numeral 77 denotes a relay-FPC attaching portion provided in a base-portion-side surface of the head suspension 74.

Figure 8A:
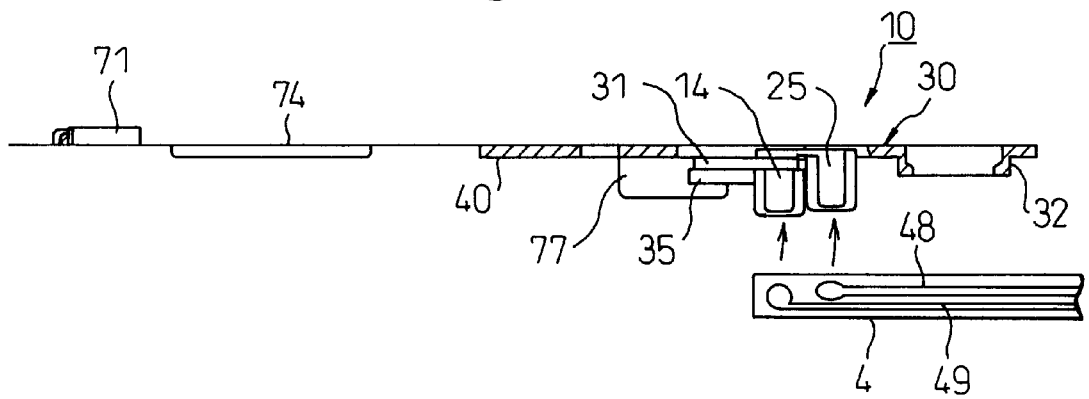
FIG. 8A is a side view showing the first embodiment shown in FIG. 7A after assembled.
Figure 8B:
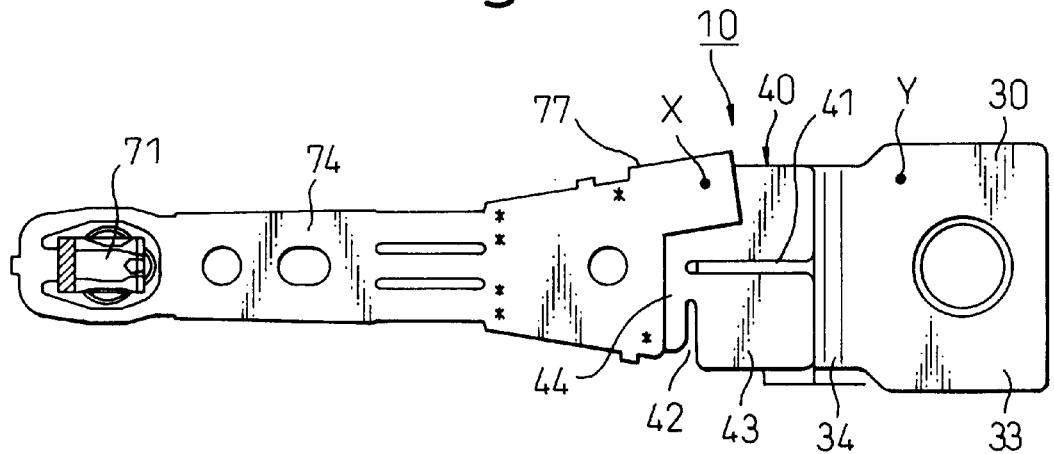
FIG. 8B is a plan view of the first embodiment shown in FIG. 8A.

FIG. 8A is a side diagram showing the mechanism 10 for producing a minute movement of a head, which is the first embodiment of the present invention illustrated in FIG. 7A, after it is assembled. FIG. 8B is a plan view of the assembled mechanism 10 for producing a minute movement of the head. When the mechanism 10 for producing a minute movement of the head is assembled, the first wire connecting portion 14 and the second wire connecting portion 25 respectively provided on the bottom and top surfaces of the piezoelectric elements 31 are placed in such a way as to be adjacent to each other. This facilitates soldering of the relay FPC in which lead patterns for the wire connecting portions 14 and 25 are formed. Consequently, the applying of a voltage to each of the first electrode 1 and the second electrode 2 is easily achieved.

Incidentally, the wire connecting portions 14 and 25 are folded at right angles with respect to the first electrode 1 and the second electrode 2 and thus are in parallel with a side surface of the carriage arm 72. However, the wire connecting portions 14 and 25 may be used without being folded.

additionally, a head signal line is fixed onto the head suspension 74. Therefore, in the case that the head suspension 74 is connected to a ground for the device, thus, to the actuator base 30, this embodiment has an effect on noises against recording/reproducing signals for the head. To realize this, a point X at the side of the base portion of the head suspension 74 is connected to a point Y on the stationary portion 33 of the actuator base 30, which is close to the point X, by a conductive piece or a lead wire (not shown). As a result, the head suspension 74 is connected to the ground without wire routing and soldering. Thus, an assembly operation is simplified.

Figure 8C:
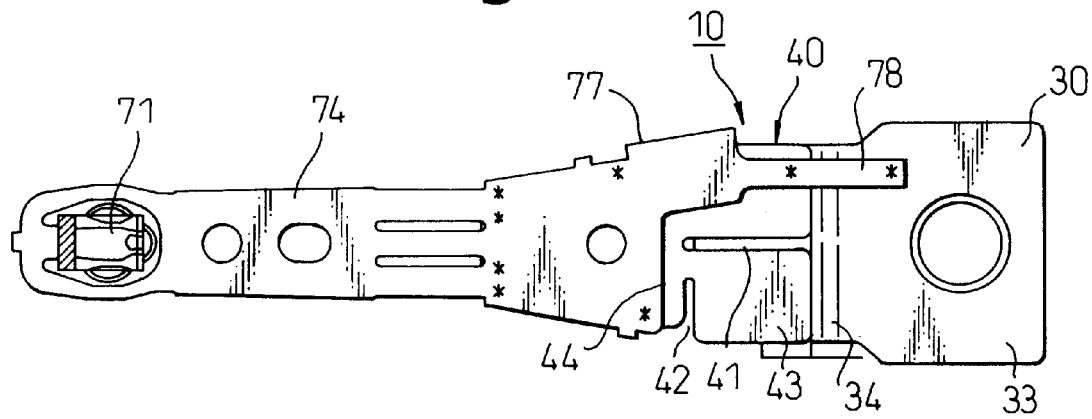
FIG. 8C is a plan view of a modification of the embodiment shown in FIG. 8B.

If a conducting tongue 78 is formed by preliminarily expanding a part of a relay FPC attaching portion at the side of the base portion of the head suspension 74 to the actuator base 30 at that time as illustrated in FIG. 8C, the head suspension 74 is connected to the ground through the actuator base 30 simply by spot welding this conducting tongue 78 to the actuator base 30 after-the mechanism 10 for producing a minute movement of the head is assembled. Thus, the number of components is reduced. Consequently, the cost of the device is reduced still more.

Incidentally, in the first embodiment, the conductive layer 11 of the first electrode 1 is electrically insulated by the insulating layer 12 thereof from the conductive layer 13 thereof. Moreover, the conductive layer 11 of the second electrode 2 is insulated by the insulating layer 12 thereof from the conductive layer 13 thereof. Thus, a ground for driving the piezoelectric elements 31 is established separately from a ground for the head signal. With such a structure, a voltage for driving the piezoelectric elements 31 hardly affects the S/N ratio of the head signal.

Figure 9A:
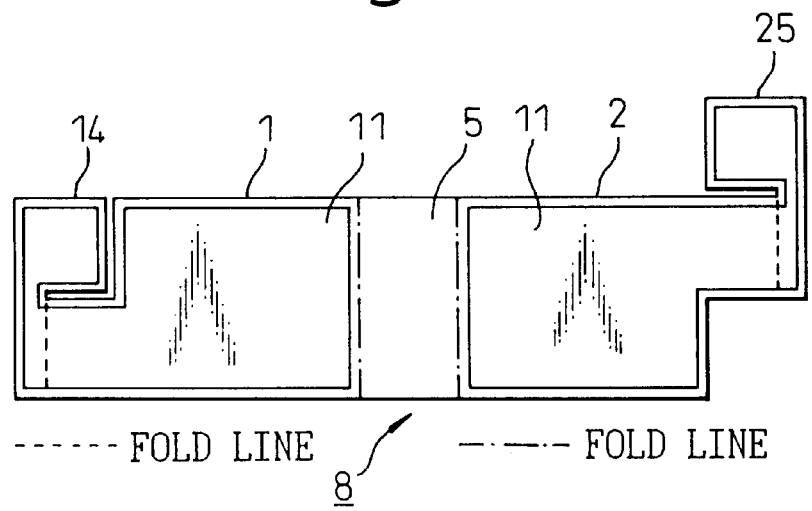
FIG. 9A is a developed view of an electrode member into which first and second electrode members are integrated with each other.
Figure 9B:
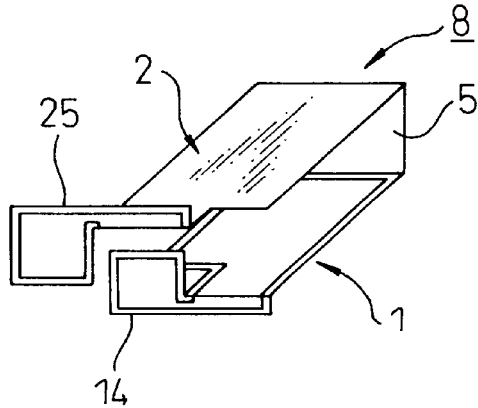
FIG. 9B is a perspective diagram showing a shape of the electrode member of FIG. 9A after it is assembled.

FIG. 9A shows the constitution of an integrated electrode 8 which is integrally constituted by the first electrode 1 and the second electrode 2 to be used by the first embodiment. The integrated electrode 8 is formed by connecting a terminal portion at the side, at which the wire connecting portion 14 is not provided, of the first electrode 1 to another terminal portion at the side, at which the wire connecting portion 25 is not provided, of the second electrode 2 by a connecting wall 5 so that the conductive layers 11 are placed on the same side. The integrated electrode 8 is easily manufactured because the conductive layers 11 are placed at the same side. Further, both end portions of the connecting wall 5 of this integrated electrode 8, which are indicated by one-dot chain lines, are folded at a right angle so that both of the end portions thereof become valley portions. Furthermore, a border portion, which is indicated by a dashed line, between the wire connecting portion 14 and the first electrode 1 and a border portion, which is indicated by a dashed line, between the wire connecting portion 25 and the second electrode 2 are folded at a right angle so that the border lines become ridge portions. thus, the integrated electrode 8 is completed, as illustrated in FIG. 9B. It is sufficient that the piezoelectric elements 31 are inserted between the first electrode 1 and the second electrode 2.

Figure 9C:
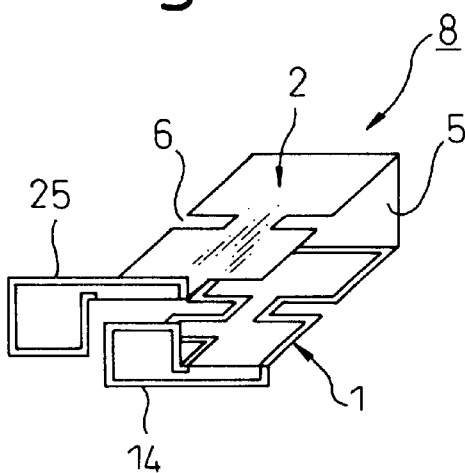
FIG. 9C is a perspective view of a modification of the electrode member of FIG. 9B.
Figure 9D:
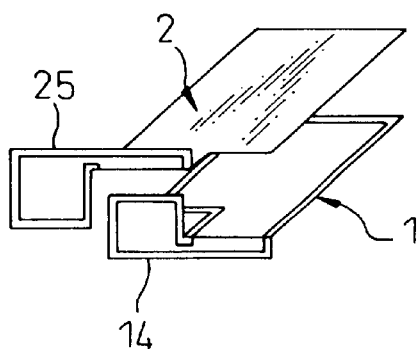
FIG. 9D is a perspective diagram showing the electrode members composed of the electrode member of FIG. 9B and formed separately from each other.
Figure 9E:
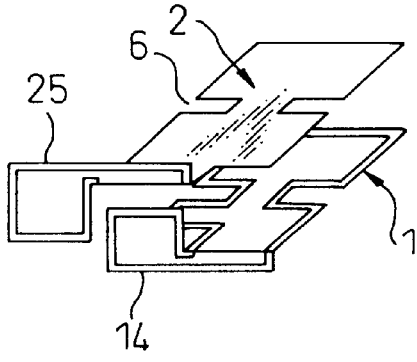
FIG. 9E is a perspective diagram showing the electrode members composed of the electrode member of FIG. 9C and formed separately from each other.

Further, notches 6 may be provided in a part corresponding to a portion between the two piezoelectric elements 31 in each of the first electrode 1 and the second electrode 2 of the integrated electrode 8, as illustrated in FIG. 9C. Owing to the notches 6, deformation of the hinge plate 40 is less limited by the electrodes 1 and 2. Thus, a large moving range of the mechanism 10 is obtained. Furthermore, as illustrated in FIGS. 9D and 9E, the connecting wall 5 may be deleted after the integrated electrode 8 shown in FIG. 9A is formed.

Figure 10A:
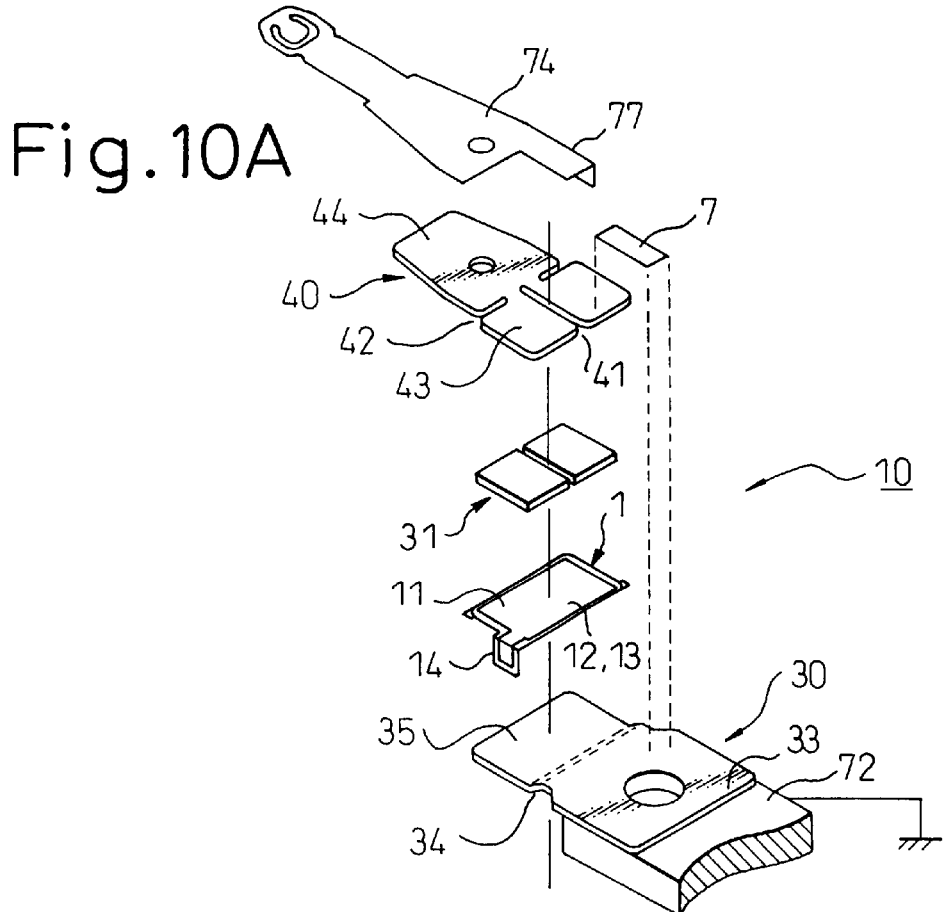
FIG. 10A is an assembly perspective diagram showing the practical constitution of a second embodiment of the present invention.
Figure 10B:
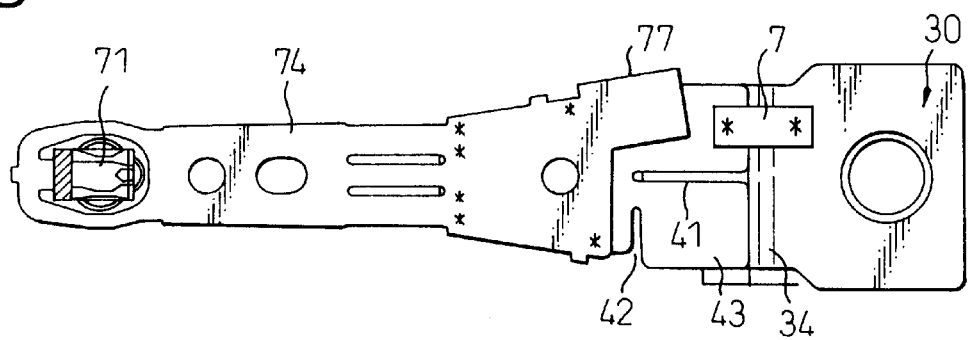
FIG. 10B is a plan view showing the second embodiment of FIG. 10A after assembled.
Figure 10C:
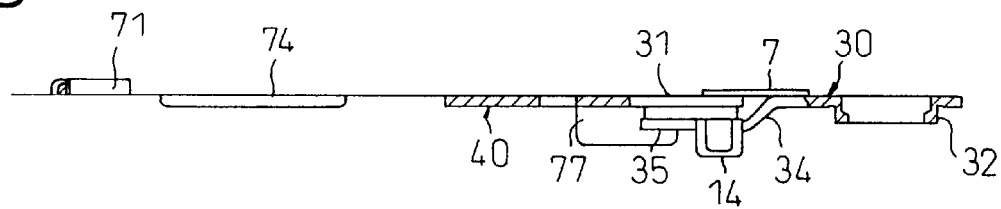
FIG. 10C is a side view of the second embodiment of FIG. 10B.

FIG. 10A is an exploded view showing the practical constitution of a mechanism 10 for producing a minute movement of the head, which is the second embodiment of the present invention. FIG. 10B is a plan view showing the conditions of the mechanism 10 for producing a minute movement of the head, which is shown in FIG. 10A, after assembled. FIG. 10C is a side view of the mechanism 10 of FIG. 10B. The second embodiment differs from the first embodiment only in that the second embodiment has no means equivalent to the second electrode 2 of the first embodiment. Further, the second embodiment is an example in which the points X and Y of FIG. 8B showing the first embodiment are connected by a conducting plate 7. Thus, in these figures showing the second embodiment, the constituent elements of the second embodiment, which are the same as the corresponding elements of the first embodiment, are designated by the same reference characters denoting the latter elements of the first embodiment. Moreover, the description of such elements is omitted herein. Only the portions of the second embodiment, which differ from the components of the first embodiment, will be described hereinbelow.

A voltage is applied by the relay FPC 4 to the first electrode 1 and the second electrode 2 provided at both ends of the piezoelectric elements 31 in the first embodiment, while the second electrode 2 is omitted and thus a voltage having a ground level is applied through the hinge plate 40 to surfaces of the piezoelectric elements 31, which are at the side of the hinge plate 40, in the second embodiment. Therefore, the hinge plate 40 is constituted by an electrical conductor and connected to the actuator base 30 through a conducting plate 7. The actuator base 30 is electrically connected to the carriage arm 72 by caulking. The top surfaces of the piezoelectric elements 31 are connected to the ground through the hinge plate 40, the conducting plate 7, the actuator base 30, and the carriage arm 72. A voltage is applied to the bottom surfaces of the piezoelectric elements 31 through the first electrode 1.

Thus, the number of lead patterns in the relay FPC for driving the piezoelectric elements 31 can be reduced by omitting the second electrode 2 and by using a common ground as both the ground for the head suspension 74 and the ground for driving the piezoelectric elements 31. As a result of omitting the second electrode 2, the number of components, of the mechanism 10 for producing a minute movement of the head is decreased. Moreover, the thickness and cost of the device are reduced.

Figure 11A:
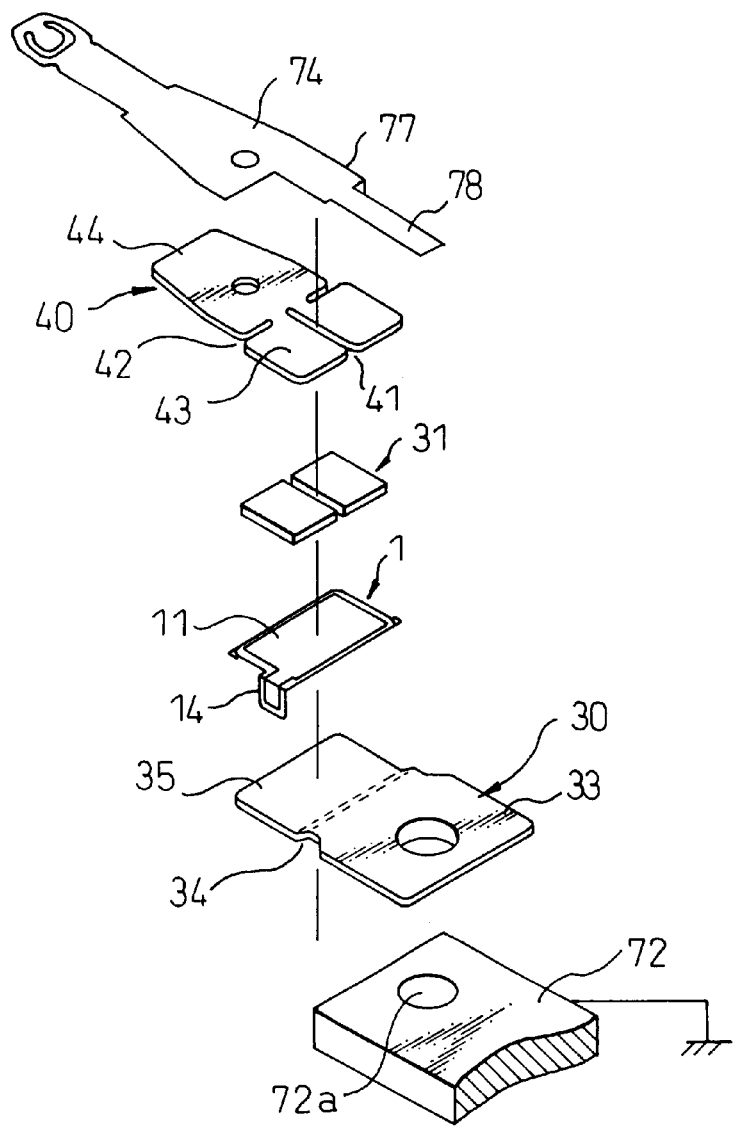
FIG. 11A is an assembly perspective diagram showing the practical constitution of a modification of the second embodiment of the present invention.
Figure 11B:
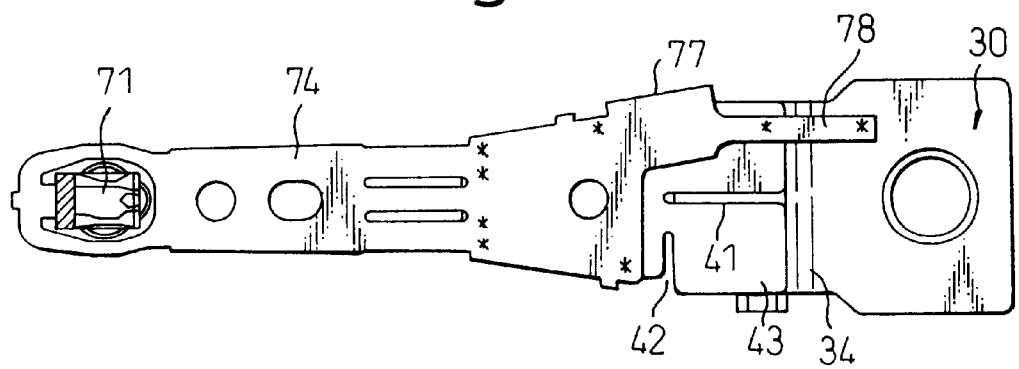
FIG. 11B is a plan view showing the modification of FIG. 11A after assembled.

FIG. 11A shows the practical constitution of a mechanism 10 for producing a minute movement of a head, which is a modification of the second embodiment of the present invention illustrated in FIGS. 10A to 10C. FIG. 11B is a plan diagram showing the mechanism of FIG. 10A after it is assembled. This modification differs from the second embodiment only in that the electrical connection between the hinge plate 40 and the actuator base 30 is achieved by using the conducting tongue 78, which is provided by extending a part of the end portion of the relay FPC attaching portion 77 of the head suspension 74, instead of the conducting plate 7. The modification of the second embodiment is easily realized because the top surface of the hinge plate 40 and the top surface of the actuator base 30 are flush with each other, as described above. Thus, constituent members of this modification, which are the same as the corresponding components of the second embodiment, are designated by the same reference characters used to indicate the same components of the second embodiment. Further, the description of such constituent members is omitted herein.

Figure 12A:
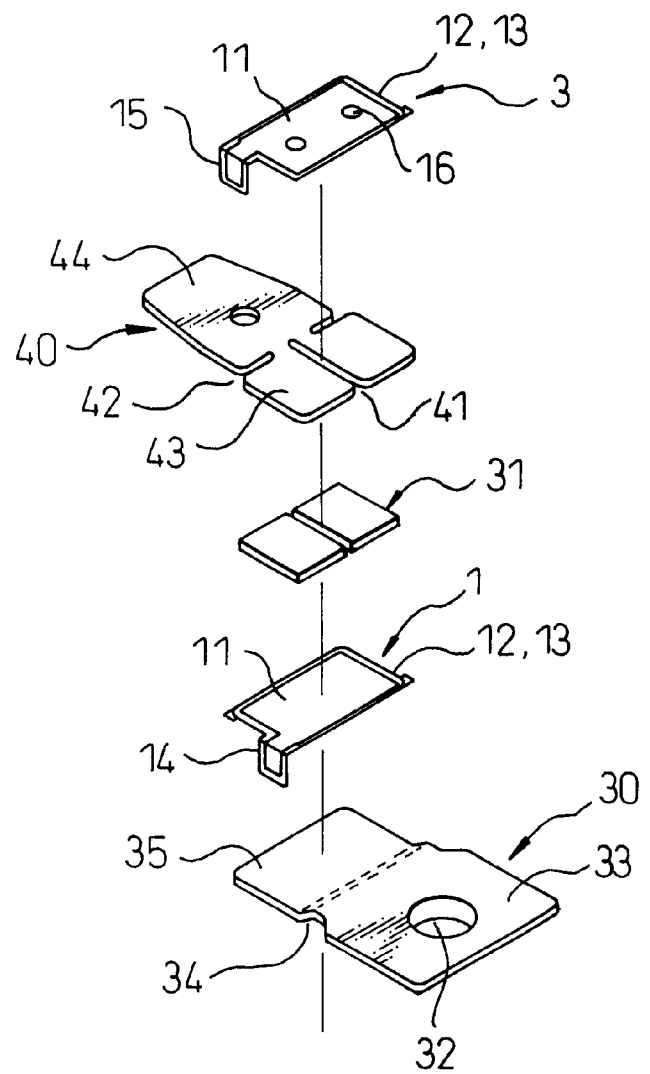
FIG. 12A is an assembly perspective diagram showing the practical constitution of another modification of the second embodiment of the present invention.

FIG. 12A is an assembling perspective diagram showing the practical constitution of another modification of the second embodiment of the present invention. This modification differs from the second embodiment and the former modification thereof described with reference to FIGS. 10A, 10B, 11A, and 11B only in that the hinge plate 40 is connected to the ground. Therefore, in these figures showing the latter modification of the second embodiment, the constituent elements of this modification, which are the same as the corresponding elements of the second embodiment and the former modification, are designated by the same reference characters denoting the latter elements of the second embodiment and the former modification. Moreover, the description of such elements is omitted herein. Only the portions of the second embodiment, which differ from the components of the second embodiment and the former modification, will be described hereinbelow.

Figure 12B:
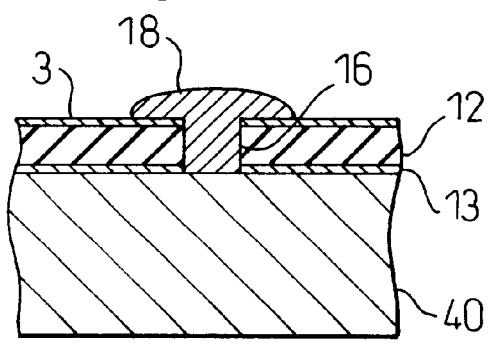
FIGS. 12B and 12C are partly enlarged sectional views of examples of the electrical connection between a third electrode member and a hinge plate shown in FIG. 12A.

In the case of the latter modification of the second embodiment, a third electrode 3 is mounted on the top surface of the hinge plate 40. This third electrode 3 has the three-layer structure in which a conductive, layer 13, an insulating layer 12, and a conductive layer 11 are stacked from the side of the hinge plate 40 in this order. A wire connecting portion 15 projecting sideward from the end portion 35 of the actuator base 30 is provided in the third electrode 3. This wire connecting portion 15 is folded at a right angle along a side surface of the carriage arm 72, so that the conductive layer 11 is exposed to the outside. On the other hand, two penetration holes 16 are provided at predetermined parts of the third electrode 3. Conductive adhesive agent 18 is poured into these penetration holes 16, as illustrated in FIG. 12B, after the third electrode 3 is mounted on the hinge plate 40. The conductive layer 11 of the third electrode 3 is electrically connected to the hinge plate 40 through this conductive adhesive agent 18. Further, the wire connecting portion 15 adjoins the wire connecting portion 14 of the first electrode 1 after the mechanism 10 for producing a minute movement of the head is assembled. Thus, the wire connecting portion 15 is connected to the ground by the relay FPC 4, similarly as that in the case of the first embodiment.

Figure 12C:
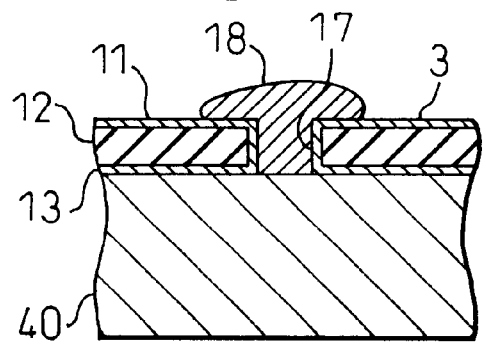

Incidentally, the penetration holes 16 provided in the third electrode 3 may be through holes 17 as illustrated in FIG. 12C. In this case, the hinge plate 40 and the third electrode 3 may be connected to each other by solder instead of the conductive adhesive agent 17.

With such constitution, the force of the third electrode 3, which prevents displacement of the hinge plate 40, is reduced. The moving range of the mechanism 10 for producing a minute movement of the head is increased. If a notch is similarly provided in the third electrode 3 along the notch 41 of the hinge plate 40, the force for preventing the deformation of the hinge plate 40 is efficiently reduced still more.

Figure 13A:
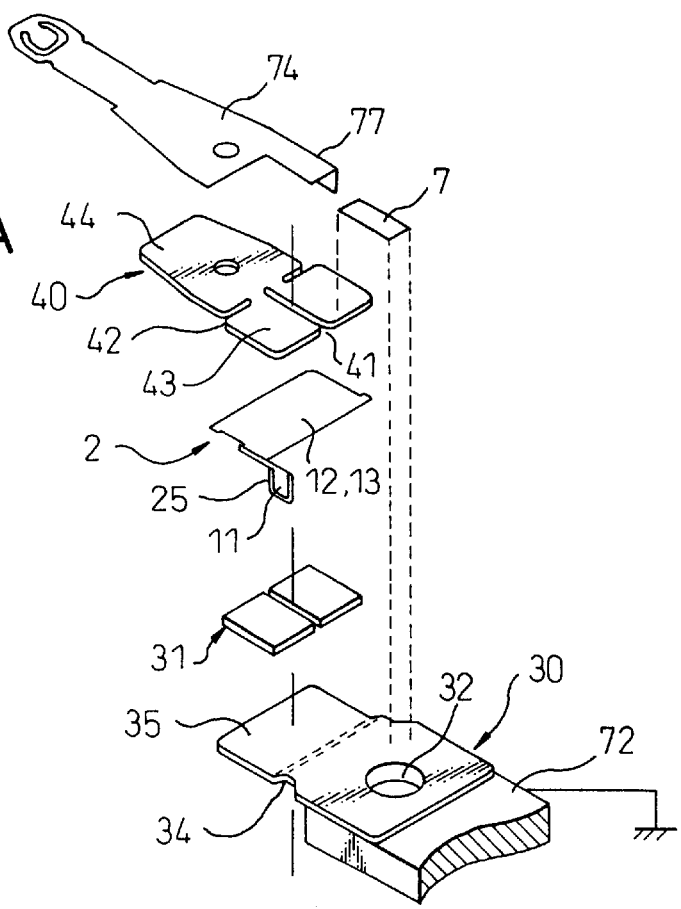
FIG. 13A is an assembly perspective diagram showing the practical constitution of a third embodiment of the present invention.
Figure 13B:
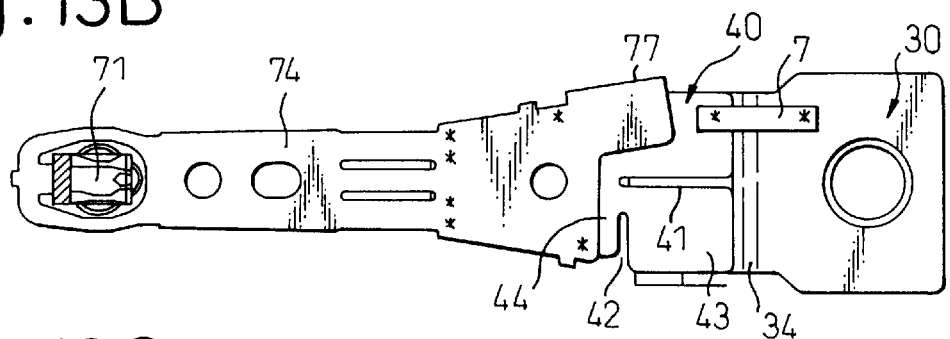
FIG. 13B is a plan view of the assembled third embodiment of FIG. 13A.
Figure 13C:
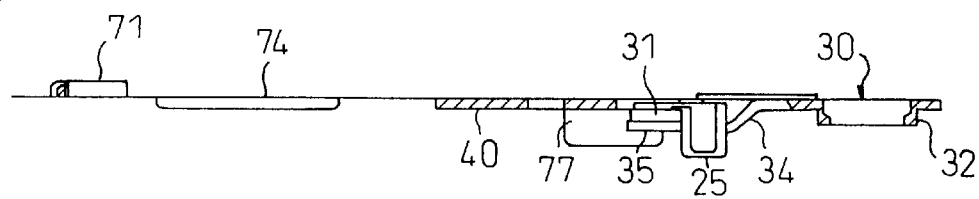
FIG. 13C is a side view of the third embodiment of FIG. 13B.

FIG. 13A is an exploded view showing the practical constitution of the mechanism 10 for producing a minute movement of the head, which is the third embodiment of the present invention. FIG. 13B is a plan view showing the condition of the mechanism 10 for producing a minute movement of the head, which is shown in FIG. 13A, after assembled. FIG. 13C is a side view of the mechanism 10 of FIG. 13B. The third embodiment differs from the first embodiment only in that the third embodiment has no means equivalent to the first electrode 1 of the first embodiment. Further, the third embodiment is an example in which the points X and Y of FIG. 8B showing the first embodiment are connected by a conducting plate 7. Thus, in these figures showing the third embodiment, the constituent elements of the third embodiment, which are the same as the corresponding elements of the first embodiment, are designated by the same reference characters denoting the latter elements of the first embodiment. Moreover, the description of such elements is omitted herein. Only the portions of the third embodiment, which differ from the components of the first embodiment, will be described hereinbelow.

A voltage is applied by the relay FPC 4 to the first electrode 1 and the second electrode 2 provided at both ends of the piezoelectric elements 31 in the first embodiment, while the first electrode 1 is omitted and thus a voltage having a ground level is applied to surfaces of the piezoelectric elements 31, which are at the side of the actuator base 30, through the actuator base 30 in the third embodiment. That is, the surfaces, which are at the side of the actuator base 30, of the piezoelectric elements 31 are connected to the ground by the conductive actuator base 30, which is connected through the, caulking projections 32, to the carriage arm 72 connected to the ground. Further, a voltage is applied to the surfaces, which are at the side of the hinge plate 40, of the piezoelectric elements 31 through the second electrode 2 having the wire connecting portion 25 provided on a side surface thereof. Furthermore, the head suspension 74 is connected to the hinge plate 40 that is connected to the ground through the conducting plate 7, the actuator base 30, and the carriage arm 72.

Figure 14A:
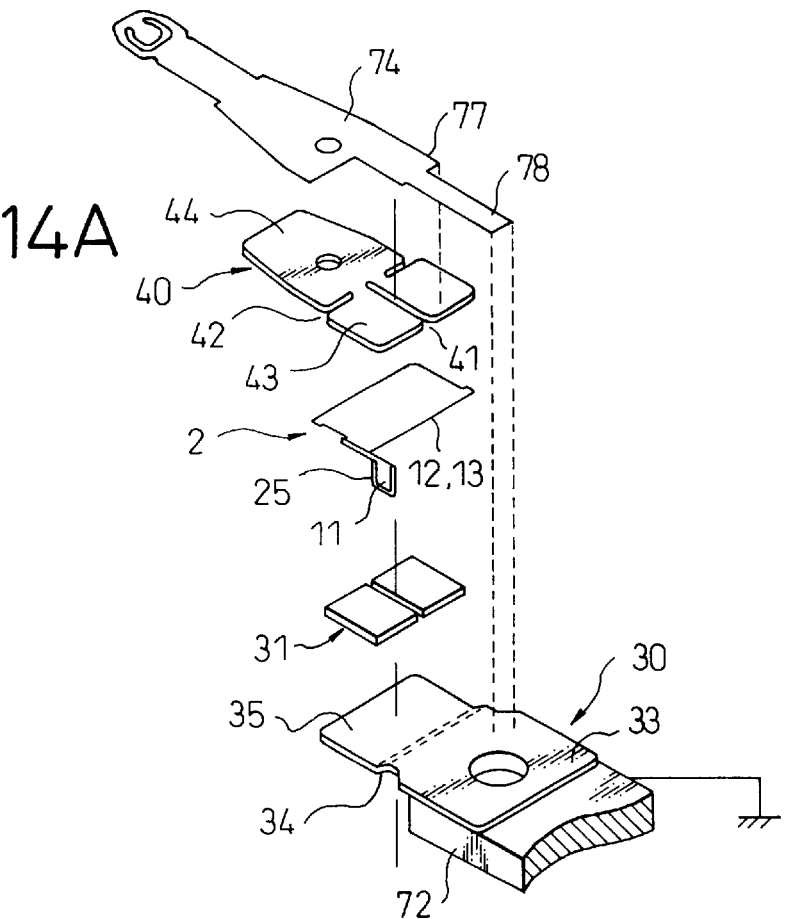
FIG. 14A is an assembly perspective diagram showing the practical constitution of a modification of the third embodiment of the present invention.
Figure 14B:
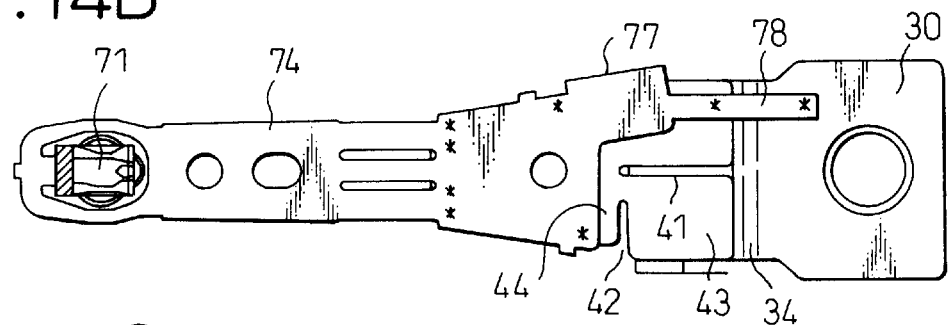
FIG. 14B is a plan view showing the modification of FIG. 14A after it is assembled.
Figure 14C:
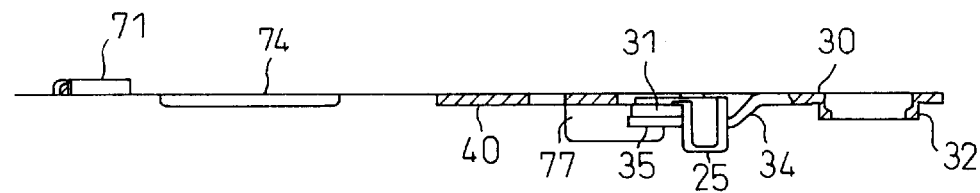
FIG. 14C is a side view of the modification of FIG. 14B.

FIGS. 14A to 14C show the practical constitution of a mechanism for producing a minute movement of a head, which is a modification of the third embodiment of the present invention illustrated in FIGS. 13A to 13C. FIG. 14A is an assembly diagram showing this modification. FIG. 14B is a plan view showing this modification after it is assembled. FIG. 14C is a side view of this modification of FIG. 14B. This modification differs from the third embodiment only in that the electrical connection between the hinge plate 40 and the actuator base 30 is achieved by using the conducting tongue 78, which is provided by extending a part of the end portion of the relay FPC attaching portion 77 of the head suspension 7!4, instead of the conducting plate 7. Thus, constituent members of this modification, which are the same as the corresponding components of the third embodiment, are designated by the same reference characters used to indicate the same components of the third embodiment. Further, the description of such constituent members is omitted herein.

FIG. 15A is an exploded diagram showing the practical constitution of a mechanism 10 for producing a minute movement of a head, which is a fourth embodiment of the present invention. FIG. 15B is an enlarged view of the head suspension 74 and the hinge plate 40 of FIG. 15A. The fourth embodiment differs from the first embodiment only in a method of connecting the head suspension 74 and the hinge plate 40 of the first embodiment to the ground. Therefore, in these figures showing the fourth embodiment, the constituent elements of this embodiment, which are the same as the corresponding elements of the first embodiment, are designated by the same reference characters denoting the latter elements of the first embodiment. Moreover, the description of such elements is omitted herein. Only the portions of the fourth embodiment, which differ from the components of the first embodiment, will be described hereinbelow.

In the case of the first embodiment, the head suspension 74 and the hinge plate 40 are connected to the ground by the following method. That is, as illustrated in FIGS. 8B and 8C, the point X is connected to the point Y by the conducting plate 7. Alternatively, the head suspension 74 is connected to the actuator base 30 by a conducting tongue 78 provided in the relay FPC attaching portion 77 of the head suspension 74. Different to this, in the case of the fourth embodiment, a grounding terminal 81 is provided at the relay FPC attaching portion 77 of the head suspension 74, in addition to a relay terminal 79 of a lead pattern 69 connected to the head.

Therefore, in the case of the fourth embodiment, the head suspension 74 is connected to the ground by the relay FPC (not shown) to be connected to this grounding terminal 81. Further, in the fourth embodiment, the hinge plate 40 is connected to the ground by connecting this grounding terminal 81 to the hinge plate 40 by a conducting plate 47, as shown in FIG. 15B. Similarly as in the case of the first embodiment, a voltage is applied to the piezoelectric elements 31 through the first electrode 1 and the second electrode 2 in the fourth embodiment.

Next, the mechanism of the present invention for producing a minute movement of the head, which is constituted in the second mode, will be described, based on fifth to seventh embodiments of the present invention.

FIG. 16 shows the constitution of the mechanism 10 for producing a minute movement of the head, which is the fifth embodiment of the present invention. In the fifth embodiment, a stationary portion 33 of an actuator base 20 formed like a plate is fixed to the carriage arm 72 by a caulking projection 32. The carriage arm 72 is usually connected to the ground. On the other hand, a portion, which is at the side of a base portion 43 of a movement-amount increasing portion 44, of a hinge plate 50 is folded twice like a crank. Further, a step portion 46 is formed between the movement-amount increasing portion 44 and a second notch 42. At that time, the hinge plate 50 is folded so that the movement-amount increasing portion 44 and the base portion 43 are in parallel with each other.

The base portion 43, on which the piezoelectric elements 31 put between the first electrode 1 and the second electrode 2, of the hinge plate 50 is connected to the bottom surface of the end portion 35 of the actuator base 20. Similarly as in the case of the mechanism constituted in the first mode, each of the first electrode 1 and the second electrode 2 consists of a conductive layer 11 constituted by an electrical conductor, such as copper, an insulating layer 12 constituted by an electrical insulator, such as polyimide, and a conductive layer 13 constituted by an electrical conductor, such as SUS, which are stacked from the side of the piezoelectric elements 31 in this order.

At that time, the top surfaces of the actuator base 20 and the hinge plate 50 are trued up and made to be flush with each other by setting the height of the step portion 46 of the actuator base 20 at a predetermined height. Thus, the top surfaces of the actuator base 20 and the hinge plate 50 are trued up and flush with each other. In the case of the mechanism constituted in the second mode, the distance between the base portion 43 of the hinge plate 50 and the head can be set at a large value, in comparison with the case of the mechanism constituted in the first mode. Thus, the former mechanism has an advantage in that the displacement increasing ratio of the hinge plate 50 is set at a large value.

FIG. 17 shows the practical constitution of the fifth embodiment of the present invention. The stationary portion 33 of the plate-like actuator base 20 is inserted, as a caulking projection 32, into a caulking hole 72a bored in the carriage arm 72 and then caulked and fixed thereto. The carriage arm 72 is connected to the ground. Moreover, the hinge plate 50 has base portions 43 and a movement-amount increasing portion 44 partitioned by a first notch 41 and second notches 42. A part, which is close to the second notch 42, of the movement-amount increasing portion 44 is folded twice and formed as a step portion 46. The base portions 43 of the hinge plate 50 are placed in such a manner as to be in parallel with the movement-amount increasing portion 44 and to be lower than the portion 44 by a height of one step. Furthermore, the head suspension 74 is fixed to the movement-amount increasing portion 44 of the hinge plate 50 by spot welding. Incidentally, reference numeral 77 denotes a relay-FPC attaching portion provided in a base-portion-side surface of the head suspension 74.

The piezoelectric elements 31 put between the first electrode 1 and the second electrode 2 are mounted on the base portion 43. Each of the first electrode 1 and the second electrode 2 has the three-layer structure described by referring to FIG. 16. Each of the conductive layers 11 is placed at a side that is in contact with the piezoelectric elements, 31. The fifth embodiment is similar to the mechanism constituted in the first mode in that a wire connecting portion 14 is provided in the first electrode 1 and that a wire connecting portion 25 is provided in the second electrode 2. The piezoelectric elements 31 put between the first electrode 1 and second electrode 2 are the same as the elements 31 described with reference to FIG. 2. The directions of polarization of the piezoelectric elements 31 are perpendicular to the direction of thickness of these elements and opposite to each other.

Figure 18A:
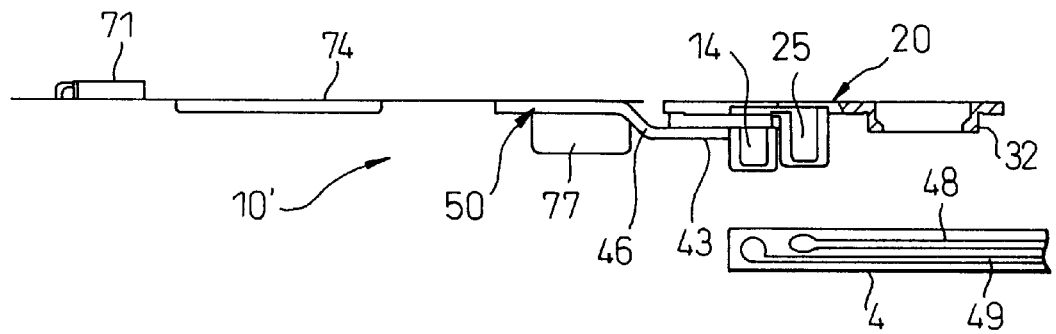
FIG. 18A is a side view showing the fifth embodiment of FIG. 17 after assembled.
Figure 18B:
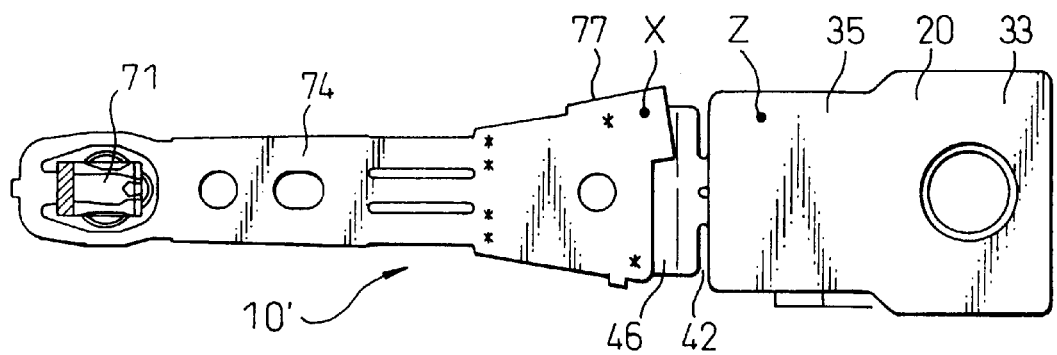
FIG. 18B is a plan view of the fifth embodiment of FIG. 18A.

FIG. 18A is a side diagram showing the mechanism 10 for producing a minute movement of a head, which is the fifth embodiment of the present invention illustrated in FIG. 17A, after assembled. FIG. 18B is a plan view of the assembled mechanism 10 for producing a minute movement of the head. As illustrated in FIG. 18A, when the mechanism 10 for producing a minute movement of the head is assembled, the first wire connecting portion 14 and the second wire connecting portion 25 respectively provided on the bottom and top surfaces of the piezoelectric elements 31 are placed in such a way as to be adjacent to each other. This facilitates soldering of the relay FPC in which lead patterns for the wire connecting portions 14 and 25 are formed. Consequently, the applying of a voltage to each of the first electrode 1 and the second electrode 2 is easily achieved by soldering the relay FPC in which lead patterns 48 and 49 for the wire connecting portions 14 and 25 are formed.

Figure 18C:
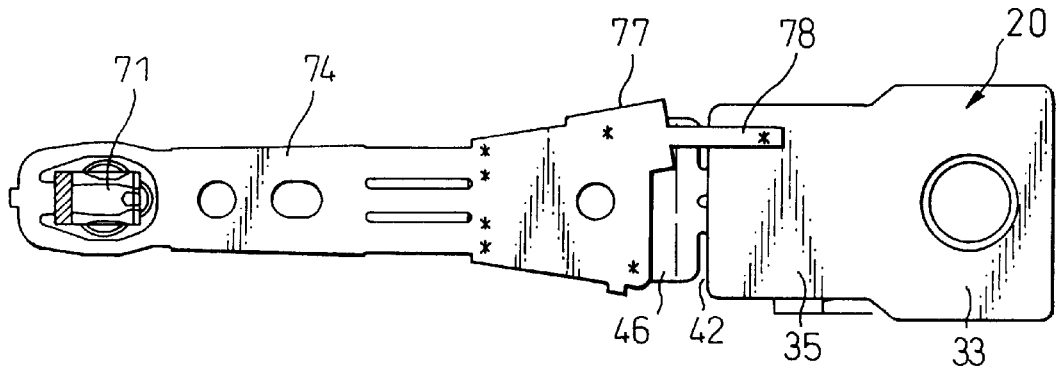
FIG. 18C is a plan view of a modification of the embodiment of FIG. 18B.

Incidentally, a head signal line is fixed onto the head suspension 74. Therefore, in the case that the head suspension 74 is connected to a ground for the device and, thus, to the actuator base 30, this embodiment has an effect on noise effecting recording/reproducing signals to and from the head. To realize this, a point X at the side of the base portion of the head suspension 74 is connected to a point Y on the stationary portion 33 of the actuator base 20, which is close to the point X, by a conductive piece or a lead wire (not shown). If a conducting tongue 78 is formed by preliminarily expanding a part of a relay FPC attaching portion at the side of the base portion of the head suspension 74 to the actuator base 20 at that time as illustrated in FIG. 18C, the head suspension 74 is connected to the ground through the actuator base 20 simply by spot welding this conducting tongue 78 to the actuator base 20 after the mechanism 10 for producing a minute movement of the head is assembled. Furthermore, the electrodes described with reference to FIGS. 9A to 9E may be used as the first electrode 1 and the second electrode 2.

FIG. 19A is an exploded view showing the practical constitution of a mechanism 10 for producing a minute movement of the head which is the sixth embodiment of the present invention. The sixth embodiment corresponds to the second embodiment of the mechanism 10 for producing a minute movement of the head, which is constituted in the first mode. That is, the sixth embodiment corresponds to the constitution obtained by removing the electrode provided at the side of the hinge plate 40 from the first embodiment. Therefore, the sixth embodiment differs from the fifth embodiment only in that the sixth embodiment has no means equivalent to the electrode, which is placed at the side of the hinge plate 50, of the fifth embodiment, namely, to the first electrode 1, and in that the second electrode 2 having a wire connecting portion 27, whose position is changed, of the sixth embodiment differs in shape from the second electrode 2 of the fifth embodiment. Further, the sixth embodiment is an example in which the points X and Z of FIG. 18B showing the fifth embodiment are connected by a conducting plate 7. Thus, in these figures showing the sixth embodiment, the constituent elements of the sixth embodiment, which are the same as the corresponding elements of the fifth embodiment, are designated by the same reference characters denoting the latter elements of the fifth embodiment. Moreover, the description of such elements is omitted herein. Only the portions of the second embodiment, which differ from the components of the fifth embodiment, will be described hereinbelow.

A voltage is applied by the relay FPC 4 to the first electrode 1 and the second electrode 2 provided at both ends of the piezoelectric elements 31 in the fifth embodiment, while the first electrode 1 is omitted and thus a voltage having a ground level is applied through the hinge plate 50 to surfaces of the piezoelectric elements 31, which are at the side of the hinge plate 50, in the sixth embodiment. Therefore, the hinge plate 50 is constituted by an electrical conductor. The head suspension 74 electrically connected to the hinge plate 50 by spot welding is connected to the actuator base 20 by using a conducting plate 7. The actuator base 20 is electrically connected to the carriage arm 72 by caulking. The bottom surfaces of the piezoelectric elements 31 are connected to the ground through the hinge plate 50, the conducting plate 74, the actuator base 20, and the carriage arm 72. A voltage is applied to the top surfaces of the piezoelectric elements 31 through the second electrode 2.

FIG. 19B is an exploded view showing the practical constitution, of a mechanism 10 for producing a minute movement of a head which is a modification of the sixth embodiment of the present invention. This modification differs from the sixth embodiment only in that the electrical connection between the head suspension 74 and the actuator base 20 is achieved by using the conducting tongue 78, which is provided by extending a part of the end portion of the relay FPC attaching portion 77 of the head suspension 74, instead of the conducting plate 7. Thus, constituent members of this modification, which are the same as the corresponding components of the sixth embodiment, are designated by the same reference characters used to indicate the same components of the sixth embodiment. Further, the description of such constituent members is omitted herein.

Figure 20:
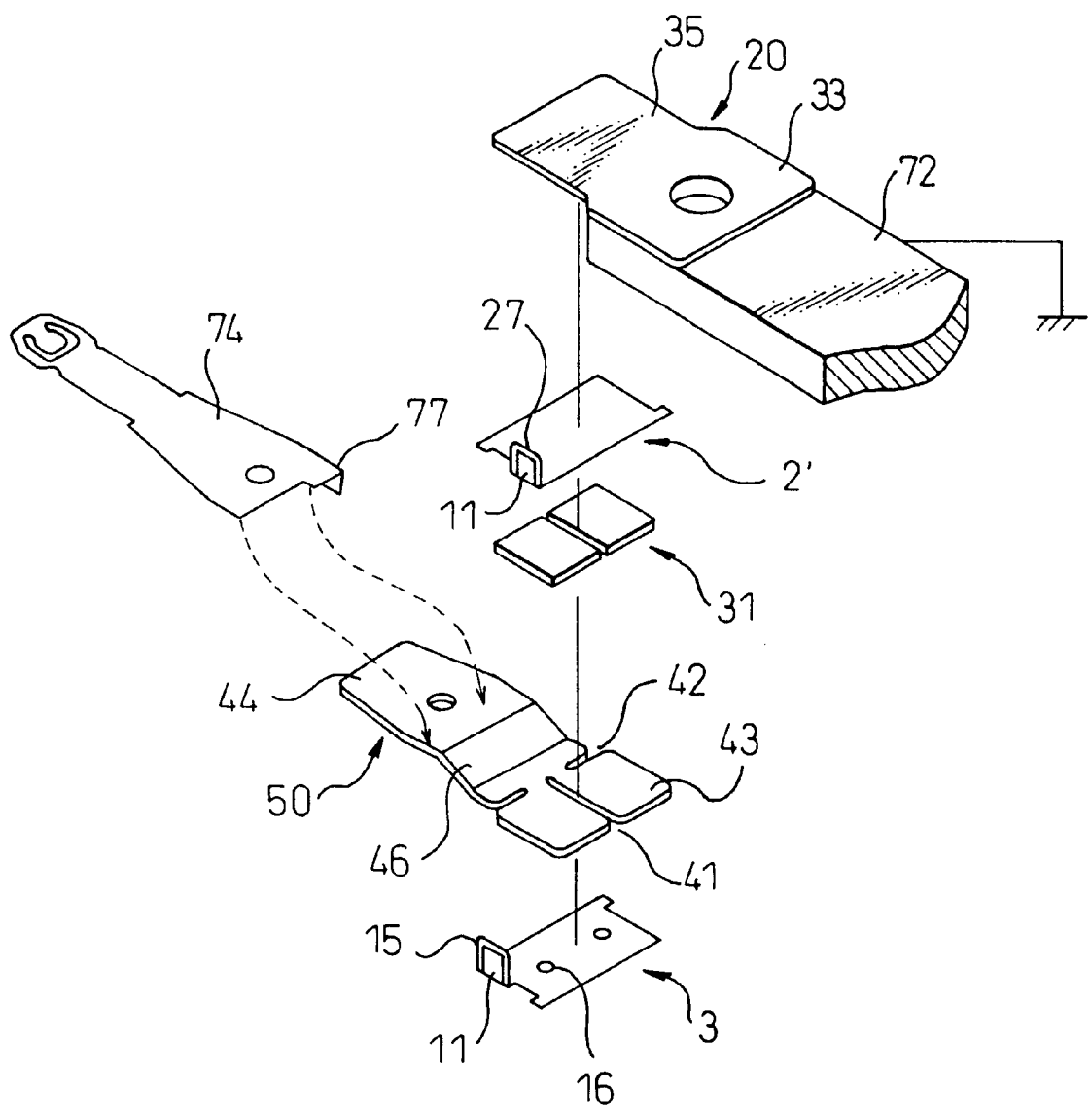
FIG. 20 is an assembly perspective diagram showing the practical constitution of another modification of the sixth embodiment of the present invention.

FIG. 20 is an exploded view showing the practical constitution of another modification of the sixth embodiment of the present invention. This modification corresponds to the latter modification of the second embodiment, which is the mechanism constituted in the first mode illustrate in FIGS. 12A to 12C. This modification of the sixth embodiment differs from the sixth embodiment and the former modification thereof described with reference to FIGS. 19A and 19B only in that the hinge plate 50 is connected to the ground. Therefore, in these figures showing the latter modification of the sixth embodiment, the constituent elements of this modification, which are the same as the corresponding elements of the sixth embodiment and the former modification, are designated by the same reference characters denoting the latter elements of the sixth embodiment and the former modification. Moreover, the description of such elements is omitted herein. Only the portions of the latter modification of the sixth embodiment, which differ from the components of the sixth embodiment and the former modification thereof, will be described hereinbelow.

In the case of the latter modification of the sixth embodiment, a third electrode 3 having a three-layer structure is mounted on the bottom surface of the hinge plate 50. A wire connecting portion 15, which projects sideward from the end portion 35 of the actuator base 20 and is provided in the third electrode 3, is folded at a right angle along a side surface of the carriage arm 72, so that the conductive layer 11 is exposed to the outside. As described with reference to FIGS. 12A to 12C, two penetration holes 16 or through holes 17 are provided at predetermined parts of the third electrode 3. The third electrode 3 is electrically connected to the hinge plate 50 by using conductive adhesive agent 18 or solder. Further, the wire connecting portion 15 adjoins the wire connecting portion 27 of the second electrode 2' after the mechanism 10 for producing a minute movement of the head is assembled. Thus, the wire connecting portion 15 is connected to the ground by the relay FPC 4, similar to that in the case of the fifth embodiment.

Figure 21A:
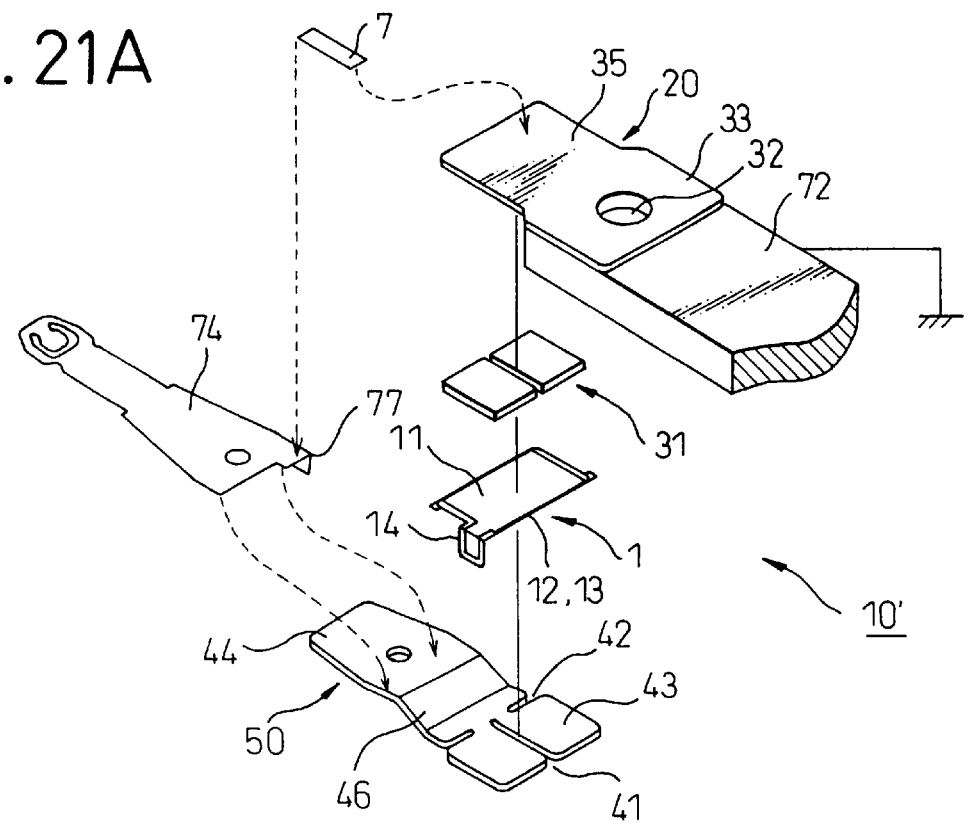
FIG. 21A is an assembly perspective diagram showing the practical constitution of a seventh embodiment of the present invention.

FIG. 21A is an exploded view showing the practical constitution of the mechanism 10 for producing a minute movement of the head which is the seventh embodiment of the present invention. The seventh embodiment differs from the fifth embodiment only in that the seventh embodiment has no means equivalent to the second electrode 2' of the fifth embodiment. Further, the seventh embodiment is an example in which the points X and Z of FIG. 18B showing the fifth embodiment are connected by a conducting plate 7. Thus, in these figures showing the seventh embodiment, the constituent elements of the seventh embodiment, which are the same as the corresponding elements of the fifth embodiment, are designated by the same reference characters denoting the latter elements of the fifth embodiment. Moreover, the description of such elements is omitted herein. Only the portions of the seventh embodiment, which differ from the components of the fifth embodiment, will be described hereinbelow.

A voltage is applied by the relay FPC 4 to the first electrode 1 and the second electrode 2 provided at both ends of the piezoelectric elements 31 in the fifth embodiment, while the second electrode 2' is omitted and thus a voltage having a ground level is applied to surfaces of the piezoelectric elements 31, which are at the side of the actuator base 20, through the actuator base 30 in the seventh embodiment. That is, the surfaces, which are at the side of the actuator base 30, of the piezoelectric elements 31 are connected to the ground by the conductive actuator base 20, which is connected through the caulking projections 32, to the carriage arm 72 connected to the ground. On the other hand, a voltage is applied to the surfaces, which are at the side of the hinge plate 50, of the piezoelectric elements 31 through the first electrode 1 having the wire connecting portion 14 provided on a side surface thereof. Furthermore, the hinge plate 50 is connected to the head suspension 74 that is connected to the ground through the conducting plate 7 and the actuator base 20.

Figure 21B:
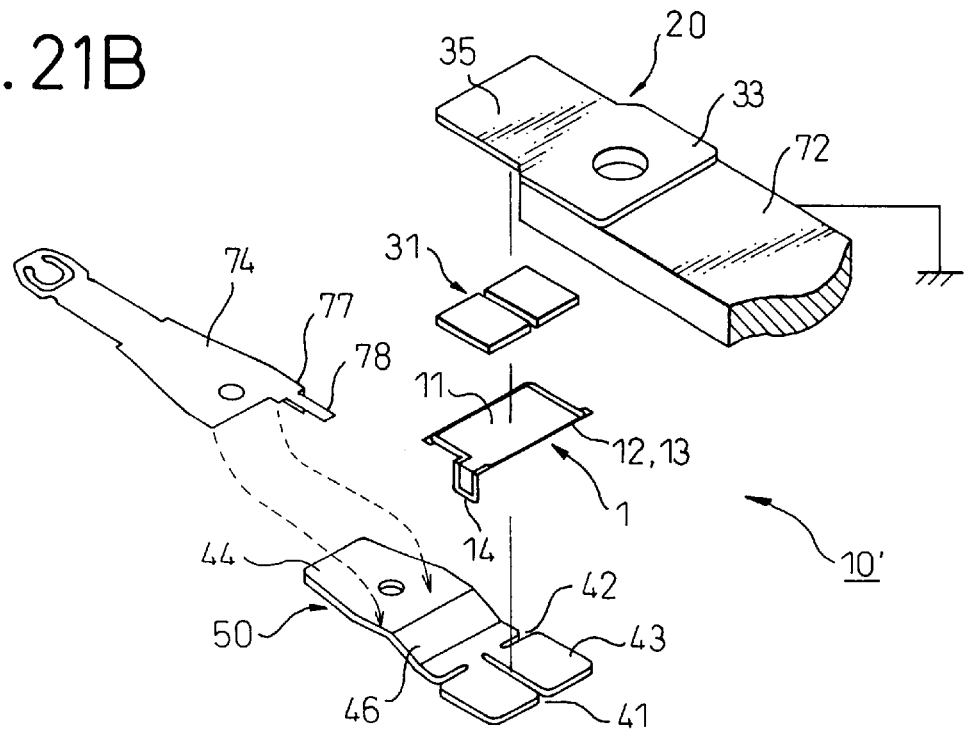
FIG. 21B is an assembly perspective diagram showing the practical constitution of a modification of the seventh embodiment of the present invention.

FIG. 21B shows the practical constitution of a mechanism 10 for producing a minute movement of a head, which is a modification of the seventh embodiment of the present invention. This modification differs from the seventh embodiment only in that the electrical connection between the head suspension 74 and the actuator base 20 is achieved by using the conducting tongue 78, which is provided by extending a part of the end portion of the relay FPC attaching portion 77 of the head suspension 74, instead of the conducting plate 7. Thus, constituent members of this modification, which are the same as the corresponding components of the seventh embodiment, are designated by the same reference characters used to indicate the same components of the seventh embodiment. Further, the description of such constituent members is omitted herein.

As described above, in the case of the mechanism 10 of the present invention for producing a minute movement of the head, a height H from a disk-medium-side surface of the slider 71 to a surface, which is at the side opposite to the disk medium, of the carriage arm 72 is reduced. Moreover, the energizing of the electrodes placed on the top and bottom surfaces of the piezoelectric elements 31 is easily achieved through the wire connecting portions. Hereunder, the difference in the height between the conventional mechanism for producing a minute movement of the head and the mechanism of the present invention for producing a minute movement of the head will be described by using FIGS. 22A and 22B.

Figure 22A:
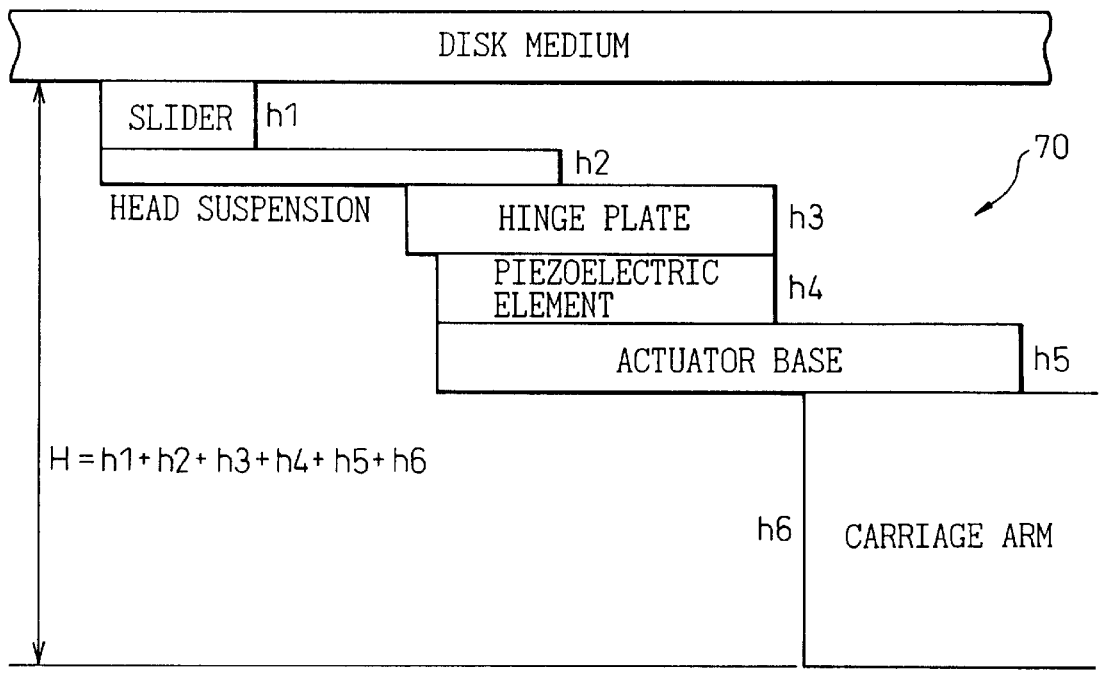
FIGS. 22A and 22B are diagrams respectively illustrating, for comparison, a change in the height between a carriage arm and a slider of a conventional mechanism for producing a minute movement of a head, and a change in the height between such elements of a mechanism for producing a minute movement of a head according to the present invention.
Figure 22B:
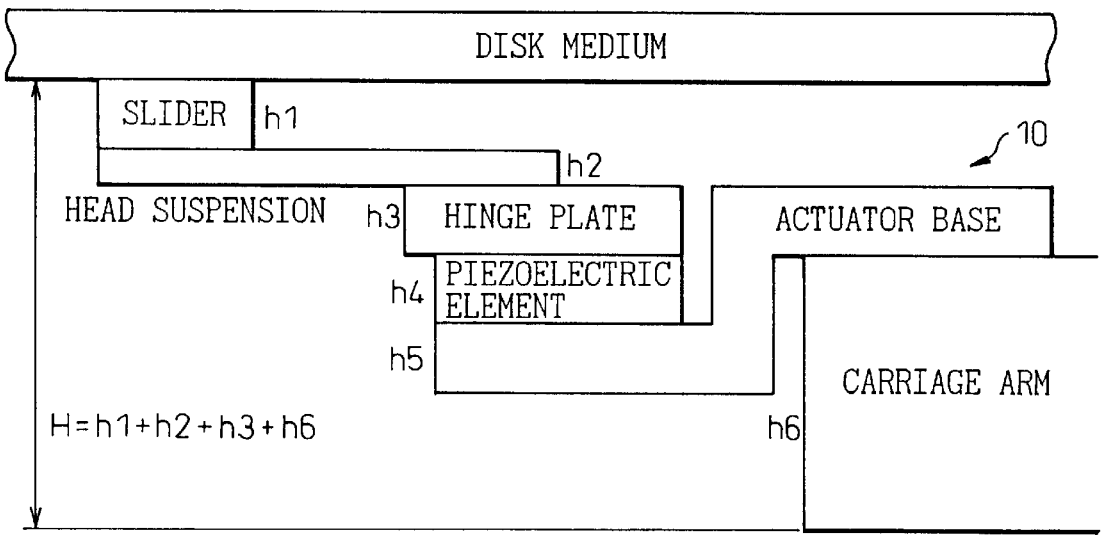

FIG. 22A schematically shows the constitution of the conventional mechanism 70 for producing a minute movement of the head, which has been described with reference to FIGS. 1 to 3B. In the conventional mechanism 70 for producing a minute movement of the head, the actuator base is mounted on the carriage arm. Further, the hinge plate is mounted on this actuator base by putting the piezoelectric elements therebetween. Moreover, the head suspension having the slider is fixed to this hinge plate. Let h1, h2, h3, h4, h5, and h6 denote a thickness of the slider, a thickness of the head suspension, a thickness of the hinge plate, a thickness of the piezoelectric elements, a thickness of the actuator base, and a thickness of the carriage arm, respectively. Thus, the height H from the disk-medium-side surface of the slider 71 to the surface, which is at the side opposite to the disk medium, of the carriage arm 72 is given by the following equation:

$$H=h1+h2+h3+h4+h5+h6$$

In contrast with this, in the case of the mechanism 10 of the present invention for producing a minute movement of the head, which is constituted in the first mode, the actuator base, which is folded like a crank and has a lowered end portion, is mounted on the carriage arm. Further, the hinge plate is mounted on the portion, which is lowered by the height of one step, of this actuator base by putting the piezoelectric elements therebetween. Furthermore, the head suspension having the slider is fixed to this hinge plate. Incidentally, supposing that the actuator base is folded so that the top surface of the hinge plate and the top surface of the actuator base are at the same position or level, the height H from the disk-medium-side surface of the slider 71 to the surface, which is at the side opposite to the disk medium, of the carriage arm 72 is given by the following equation where the thickness of the slider, the thickness of the head suspension, the thickness of the hinge plate, the thickness of the piezoelectric elements, the thickness of the actuator base, and the thickness of the carriage arm are denoted by h1, h2, h3, h4, h5, and h6, respectively. Additionally, this height H has the same value even in the second embodiment of the present invention in which a step is provided at the side of the hinge plate.

$$H=h1+h2+h3+h6$$

Thus, according to the present invention, the thickness of the piezoelectric elements including the electrodes and the thickness of one of the hinge plate and the actuator base are decreased by containing such constituent elements in a front portion of the carriage arm, which is originally thick. Consequently, the height of the head actuator of the present invention for accessing disk media of the same number, that is, the height of the disk device, is decreased.

Figure 23:
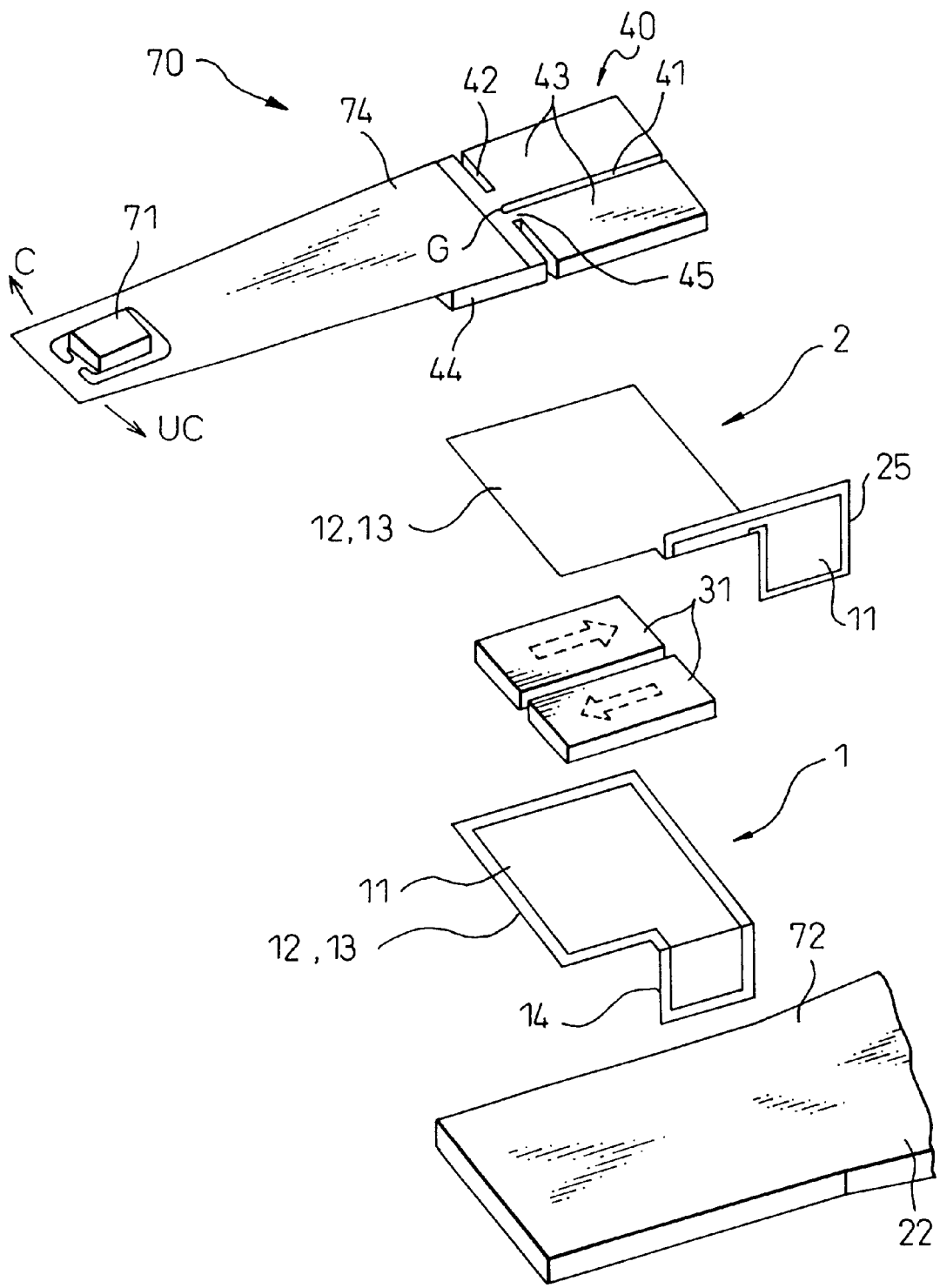
FIG. 23 is an assembling diagram showing the practical constitution of an eighth embodiment of the present invention.

Further, the constitution of the wire connecting portion 14 of the first electrode 1 of the present invention and that of the wire connecting portion 25 of the second electrode 2 may be applied to the conventional mechanism 70 for producing a minute movement of the head. FIG. 23 shows an embodiment of the present invention, in which the first electrode 1 and the second electrode 2 are employed as the electrodes for the piezoelectric elements 31 of the conventional mechanism 70 for producing a minute movement of the head, which has been described by referring to FIG. 2A. The need for forming the wiring patterns 21 and 22 on the carriage arm 72 is eliminated by adopting the first electrode 1 and the second electrode 2 of the present invention. Electric power is fed to the piezoelectric elements by the relay FPC. Thus, the constitution of the mechanism 70 for producing a minute movement of the head is simplified.

Thus, in the case of the mechanism for producing a minute movement of the head according to the present invention, which uses the piezoelectric elements utilizing shear deformation thereof, the thickness of this mechanism is reduced. Consequently, the present invention has an effect in that the height of the head actuator is limited to a low value and that the thickness of the disk device is reduced. Moreover, the wiring for driving the piezoelectric elements is simplified by providing protruded wire connecting portions in the side surfaces of the carriage arm. Consequently, the cost of the device is reduced.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A mechanism for producing a minute movement of a head, provided between a base portion of a head suspension having the head at an end portion thereof, and an end portion of a carriage arm swinging around a rotation shaft in a rocking type head actuator, said mechanism comprising:
    a stationary member, fixed to said end portion of said carriage arm;
    a moving member, attached to said base portion of said head suspension; and
    a displacing member, interposed between a predetermined surface area of a tip portion of said stationary member and a predetermined surface area of said moving member opposed to said stationary member, having a top surface to be displaced with respect to a bottom surface thereof by applying a voltage in a direction of thickness thereof,
        wherein said displacing member is interposed between a free-end of said stationary member and an end of said moving member adjacent said carriage-arm, so as to position said displacing member in a dead space delineated generally by the thickness of said carriage arm, to which said base portion of said head suspension is attached.

2. The mechanism for producing a minute movement of a head according to claim 1, wherein a space is formed between a free-end of said stationary member and a free-end of said moving member by folding said stationary member in a direction of the thickness of said carriage arm like a crank, and wherein said displacing member is accommodated in said space.

3. The mechanism for producing a minute movement of a head according to claim 1, wherein a space is formed between the free-end of said stationary member and a free end of said moving member by folding said moving member in a direction of the thickness of said carriage arm like a crank, and wherein said displacing member is accommodated in said space.

4. The mechanism for producing a minute movement of a head according to claim 1, wherein application of the voltage to said displacing member is performed by sheet-like electrode members provided on the top and bottom surfaces of said displacing member, wherein insulating members are interposed between said electrode member and said stationary member and between said electrode member and said moving member, and wherein each of said electrode members has a wire connecting portion connected to external wiring that is connected to a power supply.

5. The mechanism for producing minute movement of a head according to claim 4, wherein said electrode member is constituted by stacking a stainless-steel thin plate, a polyimide layer, and a copper foil in this order.

6. The mechanism for producing minute movement of a head according to claim 4, wherein said electrode member is constituted by a flexible printed circuit board and the connection of the printed circuit board, the piezoelectric element, the moving member, and the stationary member is performed by gluing.

7. The mechanism for producing minute movement of a head according to claim 4, wherein said wire connecting portion of the electrode member is folded in such a way as to fit along a side surface of the carriage arm.

8. The mechanism for producing a minute movement of a head according to claim 1, wherein said carriage arm is connected to the ground, wherein said stationary member includes an electrical conductor fixed in electrical contact to said end portion of said carriage arm,
    wherein an insulating layer, a conductive layer, and an electrode member having a wire connecting portion connected to external wiring, which is connected to a power supply, are provided between said stationary member and said displacing member so that said conductive layer is provided at a side of said displacing member, wherein said moving member is constituted by an electrical conductor and attached to said base portion of said head suspension in such a way as to electrically conduct, and
    wherein said moving member is connected to said stationary member by an electrical conductor.

9. The mechanism for producing a minute movement of a head according to claim 1, wherein said carriage arm is connected to the ground, wherein said stationary member includes an electrical conductor fixed in electrical contact to said end portion of said carriage arm,
    wherein an insulating layer, a conductive layer, and an electrode member having a wire connecting portion connected to external wiring, which is connected to a power supply, are provided between said stationary member and said displacing member so that said conductive layer is provided at a side of said displacing member,
    wherein said moving member includes an electrical conductor attached to said base portion of said head suspension in such a way as to electrically conduct, overlaid directly on said displacing member, and wherein said moving member is connected to said stationary member by an electrical conductor.

10. The mechanism for producing minute movement of a head according to claim 9, wherein said electrical conductor is a part of said head suspension.

11. The mechanism for producing a minute movement of a head according to claim 1, wherein said moving member includes an electrical conductor, wherein an electrode member consisting of an insulating layer and an electrical conductive layer is fixed to a selected surface of said moving member, which is opposite to said displacing member, wherein said electrode member has a wire connecting portion connected to external wiring, and wherein said conductive layer of said electrode member is connected to said moving member by an electrical conductor.

12. The mechanism for producing minute movement of a head according to claim 11, wherein said electrical conductor is a conductive adhesive agent.

13. The mechanism for producing a minute movement of a head according to claim 1, wherein said carriage arm is connected to the ground,
    wherein an electrode member consisting of an insulating layer, an electrical conductive layer, and a connecting terminal portion to be connected to an external lead wire is provided so that said conductive layer is in contact with a surface of said displacing member adjacent the moving member, wherein a surface of said displacing member adjacent the stationary member is electrically connected to said carriage arm through said stationary member by an electrical conductor, and wherein said moving member, to which said head suspension is attached, includes an electrical conductor connected to said stationary member.

14. The mechanism for producing a minute movement of a head according to claim 1, wherein said carriage arm is connected to the ground, wherein an electrode member consisting of an insulating layer, an electrical conductive layer, and a connecting terminal portion to be connected to an external lead wire is provided so that said conductive layer is in contact with a surface of said displacing member adjacent the moving member, wherein a surface of said displacing member adjacent the stationary member is electrically connected to said carriage arm through said stationary member, wherein said moving member includes an electrical conductor connected to said base portion of said head suspension in such a way as to electrically conduct, and is overlaid directly on said displacing member, and wherein said head suspension is connected to said stationary member by an electrical conductor.

15. The mechanism for producing minute movement of a head according to claim 4, wherein said moving member has a hinge portion for increasing a moving range of the head suspension, and said electrode member has a notch that complements a shape of said hinge of said moving member.

16. The mechanism for producing minute movement of a head according to claim 1, wherein a surface of said head suspension on which said moving member is mounted is flush with an outer surface of said stationary member opposite to an inner surface which is mounted on the carriage arm.

17. A mechanism for producing a minute movement of a head, provided between a base portion of a head suspension having the head at an end portion and an end portion of a carriage arm swinging around a rotation shaft in a rocking type head actuator, said mechanism comprising:

a stationary member, fixed to said end portion of said carriage arm;

a moving member, attached to said base portion of said head suspension;

a displacing member, interposed between a predetermined surface area in a tip portion of said stationary member and a surface of said moving member opposed to said stationary member, having a top surface to be displaced with respect to a bottom surface thereof by applying a voltage in a direction of thickness thereof; and a sheet-like electrode member, disposed on at least one of top and bottom surfaces of said displacing member, having an insulating layer and conductive layers, wherein said electrode member has a wire connecting portion connected to external wiring, and wherein said wire connecting portion is folded in such a way as to be along a side surface of said carriage arm.

* * * * *